(12) United States Patent
Fujigaya et al.

(10) Patent No.: US 9,176,568 B2
(45) Date of Patent: Nov. 3, 2015

(54) CLOCK CONTROL AND POWER MANAGEMENT FOR SEMICONDUCTOR APPARATUS AND SYSTEM

(75) Inventors: Masaki Fujigaya, Tokyo (JP); Takahiro Irita, Tokyo (JP)

(73) Assignee: Renesas Electronics Corporation, Tokyo (JP)

(*) Notice: Subject to any disclaimer, the term of this patent is extended or adjusted under 35 U.S.C. 154(b) by 87 days.

(21) Appl. No.: 13/543,118

(22) Filed: Jul. 6, 2012

(65) Prior Publication Data

US 2013/0009684 A1    Jan. 10, 2013

(30) Foreign Application Priority Data

Jul. 6, 2011    (JP) .................................. 2011-149875

(51) Int. Cl.
*H03L 5/00*    (2006.01)
*G06F 1/32*    (2006.01)

(52) U.S. Cl.
CPC ............. *G06F 1/324* (2013.01); *Y02B 60/1217* (2013.01)

(58) Field of Classification Search
None
See application file for complete search history.

(56) References Cited

U.S. PATENT DOCUMENTS

| | | | | |
|---|---|---|---|---|
| 5,167,024 A * | 11/1992 | Smith et al. | | 713/322 |
| 5,860,106 A | 1/1999 | Domen et al. | | |
| 5,910,930 A * | 6/1999 | Dieffenderfer et al. | | 368/156 |
| 5,996,083 A * | 11/1999 | Gupta et al. | | 713/322 |
| 6,073,244 A | 6/2000 | Iwazaki | | |
| 6,088,808 A * | 7/2000 | Iwamura et al. | | 713/324 |
| 6,601,177 B1 * | 7/2003 | Fujigaya et al. | | 713/300 |
| 7,096,145 B2 * | 8/2006 | Orenstien et al. | | 702/132 |
| 7,111,178 B2 * | 9/2006 | Rusu et al. | | 713/300 |
| 7,171,570 B2 * | 1/2007 | Cox et al. | | 713/300 |
| 7,469,355 B1 * | 12/2008 | Chong | | 713/600 |
| 7,600,141 B2 * | 10/2009 | Flynn | | 713/322 |
| 7,646,197 B2 * | 1/2010 | Misaka et al. | | 324/300 |
| 7,657,764 B2 * | 2/2010 | Jorgenson et al. | | 713/300 |
| 8,095,818 B2 * | 1/2012 | Jorgenson et al. | | 713/501 |
| 8,415,994 B2 * | 4/2013 | Liu et al. | | 327/143 |
| 8,499,182 B2 * | 7/2013 | Fujigaya | | 713/323 |
| 2002/0083354 A1 | 6/2002 | Adachi | | |
| 2008/0307240 A1 * | 12/2008 | Dahan et al. | | 713/320 |

(Continued)

FOREIGN PATENT DOCUMENTS

| | | |
|---|---|---|
| JP | 11-184554 A | 7/1999 |
| JP | 11-219237 A | 8/1999 |
| JP | 2000-23355 A | 1/2000 |

(Continued)

OTHER PUBLICATIONS

U.S. Appl. No. 13/541,731, filed Jul. 4, 2012.

(Continued)

*Primary Examiner* — Alexander H Taningco
*Assistant Examiner* — Nelson Correa
(74) *Attorney, Agent, or Firm* — Miles & Stockbridge P.C.

(57) ABSTRACT

A semiconductor apparatus according to the present invention includes a circuit including a predetermined function, a clock generating circuit that generates a clock signal supplied to the circuit, a clock control circuit that controls the clock generating circuit, and a notification signal generating circuit that generates a notification signal for notifying a timing for the clock control circuit to control the clock generating circuit. A voltage supplied to the semiconductor apparatus is adjusted according to the notification signal.

22 Claims, 18 Drawing Sheets

(56) References Cited

U.S. PATENT DOCUMENTS

2012/0254595 A1    10/2012    Wu et al.
2012/0262143 A1    10/2012    Yamamoto

FOREIGN PATENT DOCUMENTS

| | | |
|---|---|---|
| JP | 2003-140768 A | 5/2003 |
| JP | 2003-298413 A | 10/2003 |
| JP | 2005-196430 A | 7/2005 |
| JP | 2005-234968 A | 9/2005 |
| JP | 2007-220148 A | 8/2007 |
| JP | 2009-106097 A | 5/2009 |
| JP | 2011-059867 A | 3/2011 |
| WO | 2011/074059 A1 | 6/2011 |

OTHER PUBLICATIONS

Office Action mailed Apr. 30, 2014, from related U.S. Appl. No. 13/541,731.

Office Action mailed Jul. 8, 2014, from related U.S. Appl. No. 13/541,731.

Office Action mailed Apr. 13, 2015 for related U.S. Appl. No. 14/579,068.

Office Action for related Japanese Application No. 2011-149874, mailed Jun. 9, 2015 (citing Foreign Patent documents 1, 2 and 5).

Office Action for related Japanese Application No. 2011-149875, mailed Jul. 7, 2015 (citing Foreign Patent Documents 1, 3 and 4).

* cited by examiner

CLOCK CONTROL AND POWER MANAGEMENT FOR SEMICONDUCTOR APPARATUS AND SYSTEM

CROSS-REFERENCE TO RELATED APPLICATIONS

This application is based upon and claims the benefit of priority from Japanese patent application No. 2011-149875, filed on Jul. 6, 2011, the disclosure of which is incorporated herein in its entirety by reference.

BACKGROUND

The present invention relates to a semiconductor apparatus and a system including the semiconductor apparatus.

In recent years, SoC (System-on-a-chip) technology that integrates a circuit capable of providing a plurality of functions into one semiconductor chip has been developed. In the semiconductor apparatus using this SoC technology, the size of the semiconductor apparatus and the operating frequency of the semiconductor apparatus tend to increase.

Japanese Unexamined Patent Application Publication Nos. 2000-023355 and 2009-106097 disclose the technique concerning a power supply apparatus that can control the output voltage to be stable. Japanese Unexamined Patent Application Publication No. 2007-220148 discloses a technique concerning the microprocessor capable of reducing the power consumption and increasing the speed.

SUMMARY

The present inventors have found various tasks while developing a semiconductor apparatus and a system including the semiconductor apparatus. One of the tasks of the present invention is to provide a semiconductor apparatus and a system including the semiconductor apparatus that can achieve stable operation.

An aspect disclosed in this document includes a semiconductor apparatus and the semiconductor apparatus includes a notification signal generating circuit.

Another aspect of the present invention is a system including a semiconductor circuit having the notification signal generating circuit and a power supply apparatus that supplies power to the semiconductor apparatus.

The present invention can provide a semiconductor apparatus and a system including the semiconductor apparatus that can achieve stable operation.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Electronic Apparatus to which a Semiconductor Apparatus is Mounted

Hereinafter, an embodiment of the present invention is described with reference to the drawings. First, before explaining the embodiment of the present invention in detail, an electronic apparatus to which a semiconductor apparatus according to the present invention is mounted is described. This electronic apparatus is a wireless communication terminal including a communication function such as a mobile phone, a smartphone, a portable game terminal, a tablet terminal, and a notebook PC (Personal Computer).

Figure 1A:
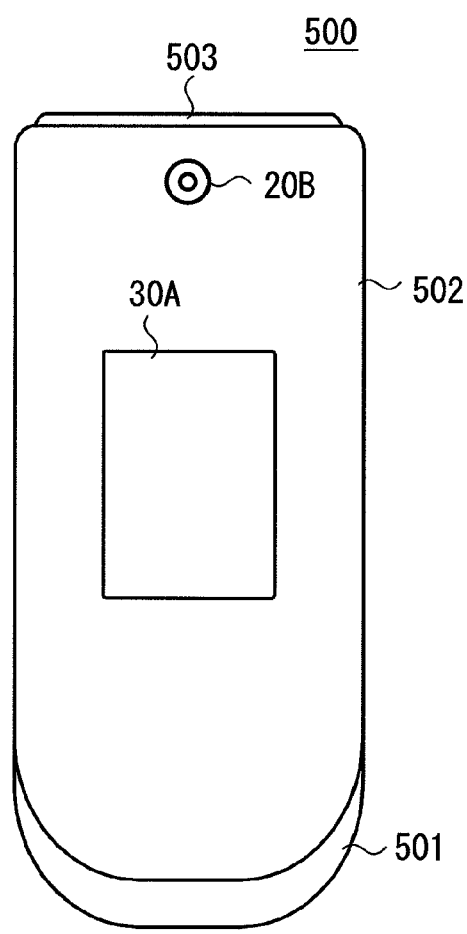
FIG. 1A is an external view showing a configuration example of a wireless communication terminal according to a first embodiment.
Figure 1B:
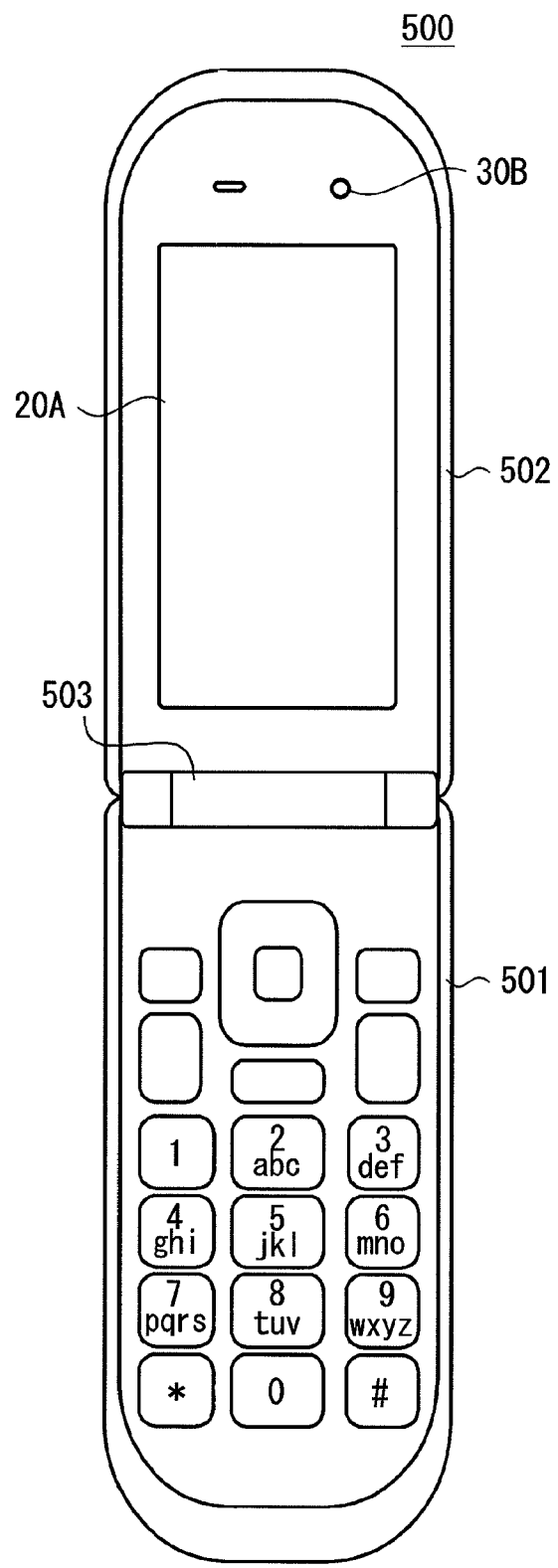
FIG. 1B is an external view showing a configuration example of the wireless communication terminal according to the first embodiment.

FIGS. 1A and 1B are external views showing an example of the wireless communication terminal to which the semiconductor apparatus according to the present invention is mounted. FIGS. 1A and 1B show a foldable mobile phone terminal as an example of the wireless communication terminal. FIG. 1A shows a closed state (folded state) of a wireless communication terminal 500 as the foldable mobile phone terminal. FIG. 1B shows an opened state of the wireless communication terminal 500. The wireless communication terminal 500 has a configuration in which a first housing 501 and a second housing 502 are coupled by a hinge 503. In the example of FIGS. 1A and 1B, a plurality of operation buttons are disposed on the first housing 501. On the other hand, the second housing 502 includes two display devices 20A and 30A and two camera devices 20B and 30B. The display devices 20A and 30A are LCD (Liquid crystal display) or OLED (Organic light-emitting diode) display ad the like.

The display device 20A is disposed so that its display surface is positioned to a main surface (main surface) inside the second housing 502. That is, the display device 20A is a main display that is visually recognized by a user when the user operates the opened terminal 500. On the other hand, the display device 30A is a sub display that is disposed so that its display surface is positioned to an outer main surface (back surface) of the second housing 502.

The camera device 20B is a main camera with a lens unit positioned to the outer main surface (back surface) of the second housing 502. On the other hand, the camera device 30B is a sub camera with a lens unit positioned to the inner surface (front surface) of the second housing 502.

Figure 2:
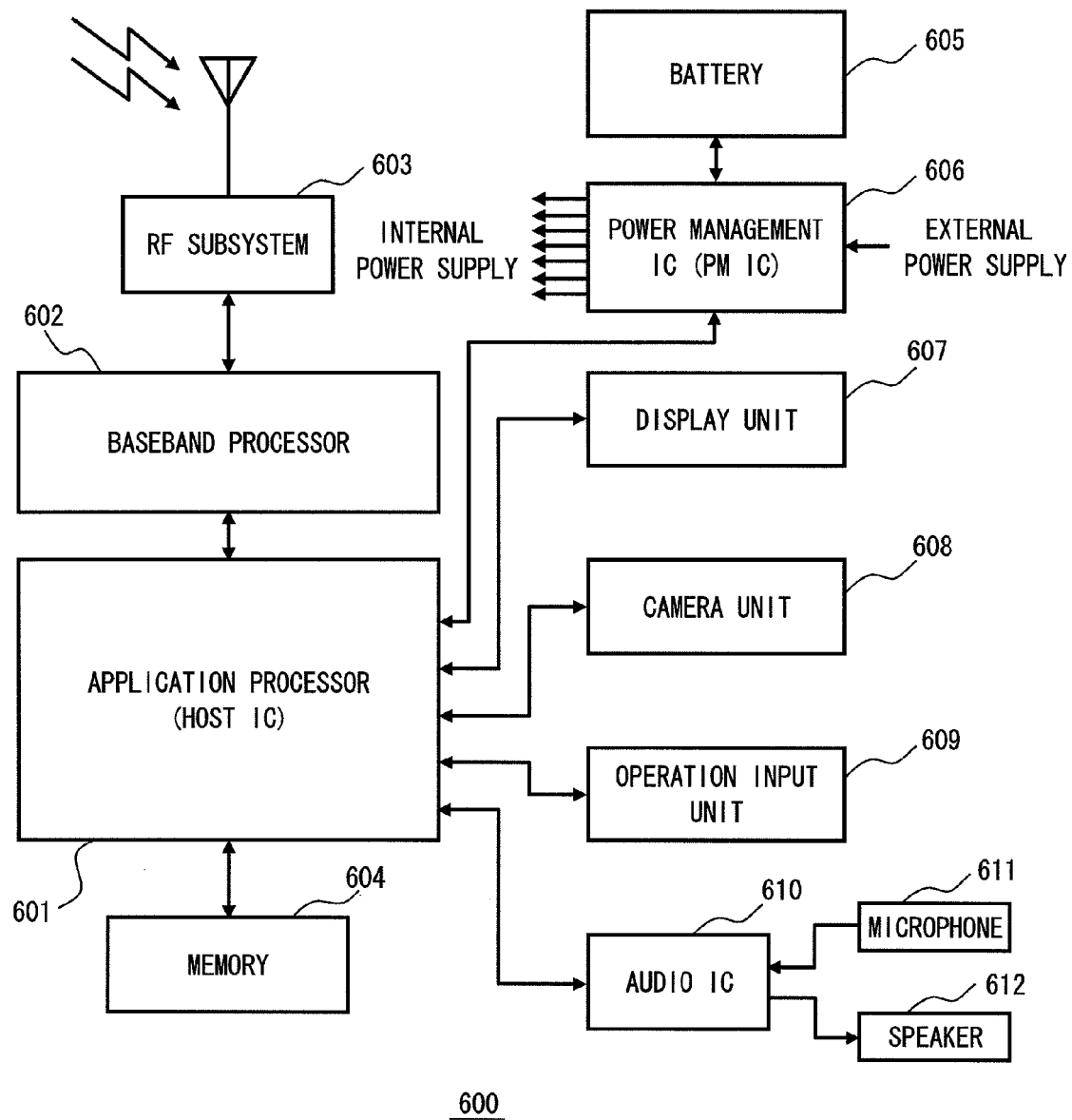
FIG. 2 is a block diagram showing a configuration example of the wireless communication terminal according to the first embodiment.

Next, a configuration of the electronic apparatus (wireless communication terminal) to which the semiconductor apparatus according to the present invention is mounted is explained with reference to FIG. 2. As shown in FIG. 2, an electronic apparatus 600 includes an application processor 601, a baseband processor 602, an RF (Radio Frequency) subsystem 603, a memory 604, a battery 605, and a power management IC (Integrated Circuit) 606, a display unit 607, a camera unit 608, an operation input unit 609, an audio IC (610), a microphone 611, and a speaker 612.

The application processor 601 reads a program stored to the memory 604 and performs processes for realizing various functions of the electronic apparatus 600. For example, the application processor 601 reads OS (Operating System) program from the memory 604 and executes this OS software.

The baseband processor 602 performs a baseband process including a coding process (for example, error correction coding for a convolutional code, a turbo code, and the like) and a decoding process to the data transmitted and received by an electronic terminal. More specifically, the baseband processor 602 receives transmission data from the application processor 601, performs the coding process to the received transmission data, and transmits the data to the RF subsystem 603. Further, the baseband processor 602 receives reception data from the RF subsystem 603, performs the decoding process to the received reception data, and transmits the data to the application processor 601.

The RF subsystem 603 performs a modulation process or a demodulation process to the data transmitted and received by the electronic terminal 600. More specifically, the RF subsystem 603 modulates the transmission data received from the baseband processor 602 with a carrier to generate a transmission signal and outputs the transmission signal via an antenna. Further, the RF subsystem 603 receives a reception signal via the antenna, demodulates the reception signal with a carrier to generate the reception data, and transmits the reception data to the baseband processor 602.

The memory 604 stores the program and the data used by the application processor 601. Further, the memory 604 includes a volatile memory that holds the stored data even when the power is cut off and a non-volatile memory that clears the stored data when the power is cut off.

The battery 605 is a battery that is used when the electronic apparatus 600 operates without depending on external power supply. Note that the electronic apparatus 600 may use the power of the battery 605 even when the external power supply is connected. In addition, it is preferable to use a secondary battery for the battery 605.

The power management IC (606) generates internal power supply based on the battery 605 or the external power supply. This internal power supply is supplied to each block of the electronic apparatus 600. At this time, the power management IC (606) controls the voltage of the internal power supply for each block that is supplied with the internal power supply. The power management IC (606) controls the voltage of the internal power supply in accordance with an instruction from the application processor 601. The power management IC (606) can also control supply and stop of the internal power supply for each block. The power management IC (606) also controls charging to the battery 605 when there is the external power supply.

The display unit 607 is, for example, a liquid crystal display, and displays various images in accordance with the process in the application processor 601. The images displayed on the display unit 607 includes a user interface image that gives operation instructions from the user to the electronic apparatus 600, a camera image, a video, and the like.

The camera unit 608 obtains the image in accordance with the instructions from the application processor. The operation input unit 609 is a user interface that is operated by the user and gives operation instructions to the electronic apparatus 600. The audio IC (610) encodes audio information obtained from the microphone 611, generates audio data, and outputs the audio data to the application processor 601 while decoding audio data transmitted from the application processor 601 and driving the speaker 612.

Configuration of the Semiconductor Apparatus

Next, the semiconductor apparatus according to this embodiment is explained.

Figure 3:
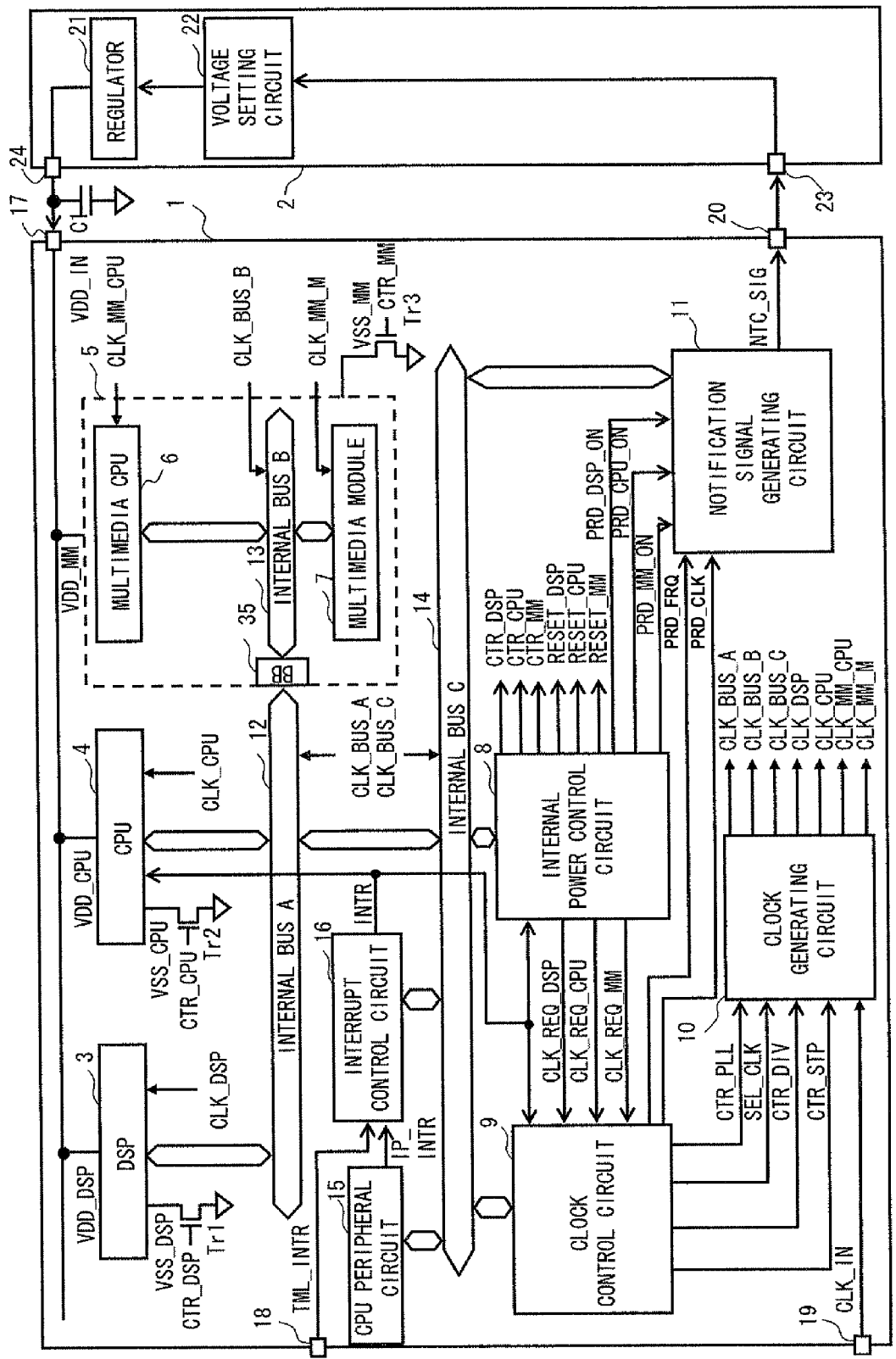
FIG. 3 is a block diagram showing a system including a semiconductor apparatus and a power supply apparatus according to the first embodiment.

FIG. 3 is a block diagram showing a system including a semiconductor apparatus 1 and a power supply apparatus 2 according to the first embodiment. The semiconductor apparatus 1 shown in FIG. 3 corresponds to the application processor 601 shown in FIG. 2, for example, and the power supply apparatus 2 shown in FIG. 3 corresponds to the power management IC (606) shown in FIG. 2.

The semiconductor apparatus 1 shown in FIG. 3 includes a DSP (Digital Signal Processing) 3, a CPU (4), a multimedia circuit 5, an internal power control circuit 8, a clock control circuit 9, a clock generating circuit 10, and a notification signal generating circuit 11. The DSP (3), the CPU (4), and the multimedia circuit 5 are circuits that include a predetermined function. The semiconductor apparatus 1 is SoC, for example.

The DSP (3) is a processor for processing a digital signal. The DSP (3) is a processor for performing specific processes at a high speed. When the DSP (3) is mounted on a mobile phone, for example, the DSP (3) is used for processes such as modulation and demodulation of an audio signal. The high-side power supply voltage is supplied to the DSP (3) from the power supply apparatus 2 via a terminal 17. Further, the DSP (3) is connected to the low-side power supply (for example, ground) via a transistor Tr1, which is a switch. Accordingly, when the transistor Tr1 is turned on (conductive state), the power is supplied to the DSP (3). A control signal CTR_DSP output from the internal power control circuit 8 controls turning on and off the power supplied to the DSP (3), which is to control turning on and off the transistor Tr1. The clock signal CLK_DSP output from the clock generating circuit 10 is supplied to the DSP (3). The DSP (3) is connected to an internal bus A (12), and can output and receive data to and from other circuits via the internal bus A (12) and other internal buses (internal buses B and C and the like). Note that a clock signal CLK_BUS_A output from the clock generating circuit 10 is supplied to the internal bus A (12).

The CPU (4) is a processor for performing various processes. The high-side power supply voltage is supplied to the CPU (4) from the power supply apparatus 2 via the terminal 17. Further, the CPU (4) is connected to the low-side power supply via a transistor Tr2, which is a switch. That is, when the transistor Tr2 is turned on (conductive state), the power is supplied to the DSP (4). A control signal CTR_CPU output from the internal power control circuit 8 controls turning on and off the power supplied to the CPU (4), which is to control turning on and off the transistor Tr2. A clock signal CLK_CPU output from the clock generating circuit 10 is supplied to the CPU (4). The CPU (4) is connected to the internal bus A (12), and can output and receive data to and from other circuits via the internal bus A (12) and other internal buses (the internal buses B and C and the like).

The multimedia circuit 5 is a circuit used for image processing and the like, and includes a multimedia CPU (6) and a multimedia module 7. The high-side power supply voltage is supplied to the multimedia circuit 5 (that is, a power supply region including the multimedia CPU (6) and the multimedia module 7) from the power supply apparatus 2 via the terminal 17. Further, the multimedia circuit 5 is connected to the low-side power supply via a transistor Tr3, which is a switch. That is, when the transistor Tr3 is turned on (conductive state), the power is supplied to the multimedia circuit 5. A control signal CTR_MM output from the internal power control circuit 8 controls turning on and off the power supplied to the multimedia circuit 5, which is to control turning on and off the transistor Tr3.

A clock signal CLK_MM_CPU output from the clock generating circuit 10 is supplied to the multimedia CPU (6). A clock signal CLK_MM_M output from the clock generating circuit 10 is supplied to the multimedia module 7. Additionally, the multimedia CPU (6) and the multimedia module 7 are connected to each other via the internal bus B (13). The internal bus B (13) is connected to the internal bus A (12) via a bus bridge 35. The multimedia CPU (6) and the multimedia module 7 can output and receive data to and from other circuits via the internal bus B (13) and other internal buses (for example internal buses A and C and the like). Note that a clock-signal CLK_BUS_B output from the clock generating circuit 10 is supplied to the internal bus B (13).

A CPU peripheral circuit 15 is a circuit used by the CPU (4). As the CPU peripheral circuit 15, there are for example, a timer unit, a watchdog timer unit, a DMA (Direct Memory Access) unit, a low voltage detecting unit, a power-on reset (POR) unit, and the like. The CPU peripheral circuit 15 is connected to the internal bus C (14). When the CPU peripheral circuit 15 issues an interrupt request to the CPU (4), the CPU peripheral circuit 15 outputs an interrupt signal IP_INTR to an interrupt control circuit 16.

The interrupt control circuit 16 receives an interrupt signal TML_INTR supplied externally via a terminal 18 and the interrupt signal IP_INTR output from the CPU peripheral circuit 15, and outputs an interrupt signal INTR to the CPU (4), the internal power control circuit 8, and the clock control circuit 9. That is, the interrupt control circuit 16 outputs the interrupt signal INTR to the CPU (4), the internal power control circuit 8, and the clock control circuit 9 at the timing when at least one of the interrupt signal TML_INTR and the interrupt signal IP_INTR is supplied. When the interrupt signal INTR is supplied to the CPU (4), the power and the clock signal is supplied to the CPU (4).

The internal power control circuit (power control circuit) 8 is a circuit for controlling turning on and off the DSP (3), the CPU (4), and the multimedia circuit 5 included in the semiconductor apparatus 1. The internal power control circuit 8 is connected to the internal bus C (14). The internal bus C (14) is connected to the internal bus A (12). Note that a clock signal CLK_BUS_C output from the clock generating circuit 10 is supplied to the internal bus C (14).

Figure 4:
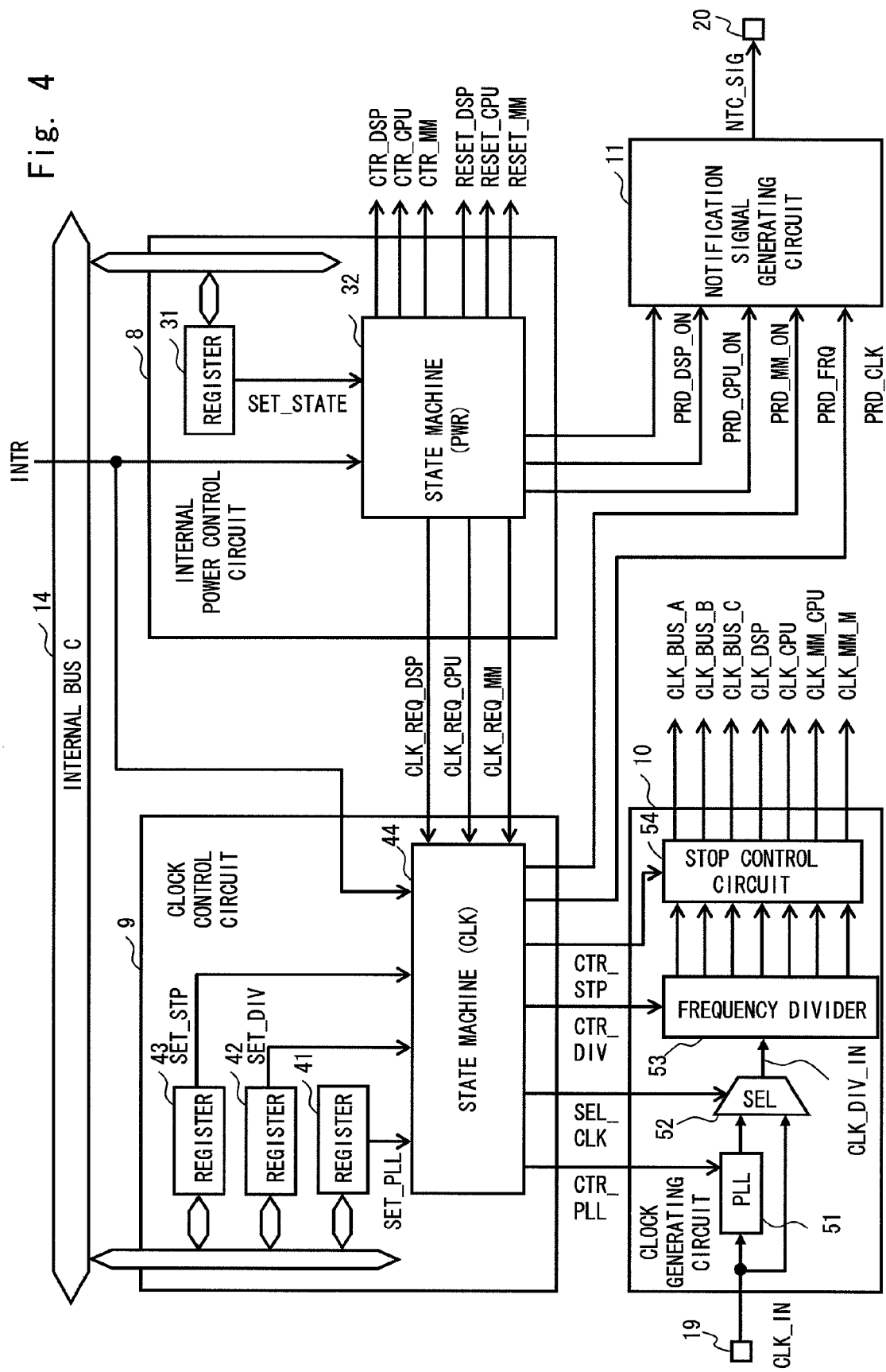
FIG. 4 is a block diagram showing details of an internal power control circuit, a clock control circuit, a clock generating circuit, and a notification signal generating circuit included in the semiconductor apparatus according to the first embodiment.

FIG. 4 is a block diagram showing details of the internal power control circuit 8, the clock control circuit 9, the clock generating circuit 10, and the notification signal generating circuit 11 included in the semiconductor apparatus 1 according to this exemplary embodiment. As shown in FIG. 4, the internal power control circuit 8 includes a register 31 and a state machine (PWR) 32 (a second state machine). In response to an instruction set to the register 31 or the CPU interruption signal INTR, the state machine (PWR) 32 controls turning on and off the power of the DSP (3), the CPU (4), and the multimedia circuit 5. When setting the instruction to the register 31, the CPU (4) writes the instruction to the register 31 via the internal bus A (12) and the internal bus C (14), for example. In response to the set instruction, the register 31 outputs to the state machine (PWR) 32 a state setting signal SET_STATE for controlling the power of the DSP (3), the CPU (4), and the multimedia circuit 5.

When the state machine (PWR) 32 controls the power of the DSP (3), the state machine (PWR) 32 outputs the control signal CTR_DSP and a power supply reset signal RESET_DSP to the DSP (3), and outputs a clock request signal CLK_REQ_DSP to the clock control circuit 9. Further, when the state machine (PWR) 32 controls the power of the CPU (4), the state machine (PWR) 32 outputs the control signal CTR_CPU and a power supply reset signal RESET_CPU to the CPU (4), and outputs a clock request signal CLK_REQ_CPU to the clock control circuit 9. Furthermore, when the state machine (PWR) 32 controls the power of the multimedia circuit 5, the state machine (PWR) 32 outputs the control signal CTR_MM and a power supply reset signal RESET_MM to the multimedia circuit 5, and outputs a clock request signal CLK_REQ_MM to the clock control circuit 9.

Moreover, the state machine (PWR) 32 outputs to the notification signal generating circuit 11 a signal PRD_DSP_ON indicating a period in which the state machine (PWR) 32 is performing a power supply process, a signal PRD_CPU_ON indicating a period in which the state machine (PWR) 32 is performing the power supply process to the CPU (4), and a signal PRD_MM_ON indicating a period in which the state machine (PWR) 32 is performing the power supply process to the multimedia circuit 5.

The state machine (PWR) 32 can have three states, which are the power supply process, a power stop state, and an idle state in order to control turning on and off the power of the DSP (3), the CPU (4), and the multimedia circuit 5. For example, to turn on the power of the CPU (4), the state machine (PWR) 32 transitions in the order of the idle state→the CPU power supply process→the idle state. On the other hand, to turn off the power of the CPU (4), the state machine (PWR) 32 transitions in the order of the idle state→the CPU power stop process→the idle state.

Figure 12:
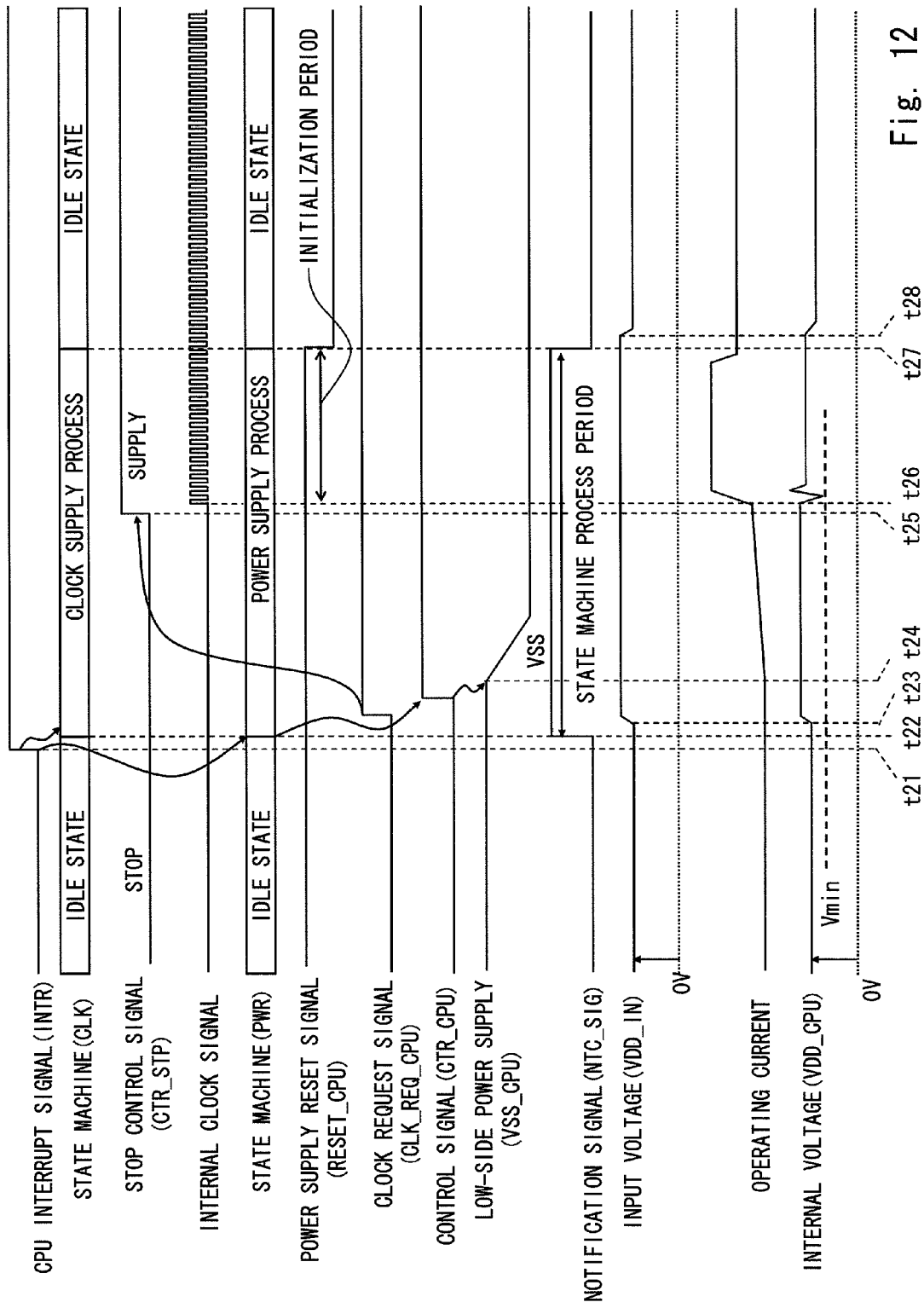
FIG. 12 is a timing chart showing an operation of a semiconductor apparatus according to a second embodiment.

More specifically, for example, in order to turn on the power of the CPU (4), the state machine (PWR) 32 transitions from the idle state to the CPU power supply process state, and performs the CPU power supply process (see the timing chart of FIG. 12). At this time, the state machine (PWR) 32 outputs the clock request signal CLK_REQ_CPU to the clock control circuit 9 so that the clock signal CLK_CPU is supplied to the CPU (4). The state machine (PWR) 32 further outputs the control signal CTR_CPU to the gate of the transistor Tr2 connected to the CPU (4) in order to turn on the power of the CPU (4). Moreover, the state machine (PWR) 32 asserts the power supply reset signal RESET_CPU to the CPU (4).

Then, the state machine (PWR) 32 cancels the power supply reset signal RESET_CPU (that is, the power supply reset signal RESET_CPU is set to low level) asserted to the CPU (4) at the timing when the clock signal supplied to the CPU (4) is stabilized. When the power supply reset signal RESET_CPU is set to low level, the state machine (PWR) 32 enters the idle state again. At this time, the power supply voltage and the clock signal CLK_CPU are supplied to the CPU (4). Further, while the state machine (PWR) 32 is performing the power supply process to the CPU (4), the state machine (PWR) 32 outputs the signal PRD_CPU_ON indicating the period of the power supply process to the notification signal generating circuit 11.

Note that the case of turning on the power of the DSP (3) and the multimedia circuit 5 is the same as the above process.

The clock control circuit 9 is a circuit for controlling the clock generating circuit 10. The clock control circuit 9 is connected to the internal bus C (14). As shown in FIG. 4, the clock control circuit 9 includes registers 41 to 43 and a state machine (CLK) 44 (a first state machine). The state machine (CLK) 44 receives a PLL setting signal SET_PLL stored to the register 41, a frequency divider setting signal SET_DIV stored to the register 42, a stop setting signal SET_STP stored to the register 43, the CPU interrupt signal INTR, and the clock request signals CLK_REQ_DSP, CLK_REQ_CPU, and CLK_REQ_MM that are output from the internal power control circuit 8.

For example, the PLL setting signal SET_PLL, the frequency divider setting signal SET_DIV, and the stop setting signal SET_STP stored to the registers 41 to 43 can be written by the CPU (4) accessing respectively to the registers 41 to 43 via the internal bus A (12) and the internal bus C (14). The PLL setting signal SET_PLL here is a signal for setting on and off of a PLL circuit 51. The frequency divider setting signal SET_DIV is a signal for setting a frequency division ratio of a frequency divider 53. The stop setting signal SET_STP is a signal for setting supply and stop of the clock signal to the DSP (3), the CPU (4), the multimedia circuit 5, and the internal buses 12 to 14.

Further, the state machine (CLK) 44 outputs a PLL control signal CTR_PLL to the PLL circuit 51, a clock selecting signal SEL_CLK to a selector 52, a frequency division control signal CTR_DIV to the frequency divider 53, and a stop control signal CTR_STP to a stop control circuit 54.

In order to control the clock signal supplied to the DSP (3), the CPU (4), the multimedia circuit 5, and each internal bus 12 to 14, the state machine (CLK) 44 can have four states, which are a clock frequency change process, a clock supply process, a clock stop process, and an idle state. For example, to change the frequency of the clock signal output from the clock generating circuit 10, the state machine (CLK) 44 transitions in the order of the idle state→the clock frequency change process→the idle state. Further, to output the clock signal from the clock generating circuit 10, the state machine (CLK) 44 transitions in the order of the idle state→the clock supply process→the idle state. On the other hand, to stop the clock signal output from the clock generating circuit 10 (to stop the clock signal generated in the clock generating circuit 10 using the stop control circuit 54), the state machine (CLK) 44 transitions in the order of the idle state→the clock stop process→the idle state.

The state machine (CLK) 44 outputs a signal PRD_FRQ indicating a period in which the state machine (CLK) 44 is performing the frequency change process to the notification signal generating circuit 11. The state machine (CLK) 44 further outputs a signal PRD_CLK indicating a period in which the state machine (44) is performing the clock supply process to the notification signal generating circuit 11.

The clock generating circuit 10 is a circuit for generating the clock signal supplied to the DSP (3), the CPU (4), the multimedia circuit 5, and each internal bus 12 to 14. As shown in FIG. 4, the clock generating circuit 10 includes the PLL circuit 51, the selector 52, the frequency divider 53, and the stop control circuit 54.

The PLL circuit 51 receives an input clock signal CLK_IN output from an external oscillator circuit and the like via a terminal 19. The PLL control signal CTR_PLL output from the clock control circuit 9 controls turning on and off the PLL circuit 51. When the PLL control signal CTR_PLL is high level, the PLL circuit 51 is turned on, generates a signal of a predetermined frequency, and outputs the generated signal to the selector 52. On the other hand, when the PLL control signal CTR_PLL is low level, the PLL circuit 51 is turned off. The PLL setting signal SET_PLL output from the register 41 sets turning on and off of the PLL circuit 51.

The selector 52 selects an output or the input clock signal CLK_IN according to the clock selecting signal SEL_CLK and outputs the selected signal to the frequency divider 53 as a signal CLK_DIV_IN.

The frequency divider 53 divides the frequency of the signal CLK_DIV_IN according to the frequency division control signal CTR_DIV and outputs the frequency-divided signal to the stop control circuit 54. The frequency division ratio of the frequency divider 53 is set based on the frequency divider setting signal SET_DIV output from the register 42.

The stop control circuit 54 is a circuit for controlling whether or not to supply the clock signal output from the frequency divider 53 to the DSP (3), the CPU (4), the multimedia circuit 5, and each internal bus 12 to 14 according to the stop control signal CTR_STP. The stop setting signal SET_STP output from the register 43 sets supply and stop of the clock signal to each circuit 3 to 5 and each internal buses 12 to 14. Note that the clock signal output from the stop control circuit 54 of the clock generating circuit 10 is also referred to as an internal clock signal. Further, the circuit including the DSP (3), the CPU (4), the multimedia circuit 5, and each internal bus 12 to 14 is hereinafter referred to as an internal circuit of the semiconductor apparatus 1.

The notification signal generating circuit 11 generates a notification signal NTC_SIG. The notification signal NTC_SIG is a signal for notifying a timing for the clock control circuit 9 to control the clock generating circuit 10. Further, the notification signal NTC_SIG is a signal for notifying the timing of the control in the internal power control circuit 8.

Figure 5:
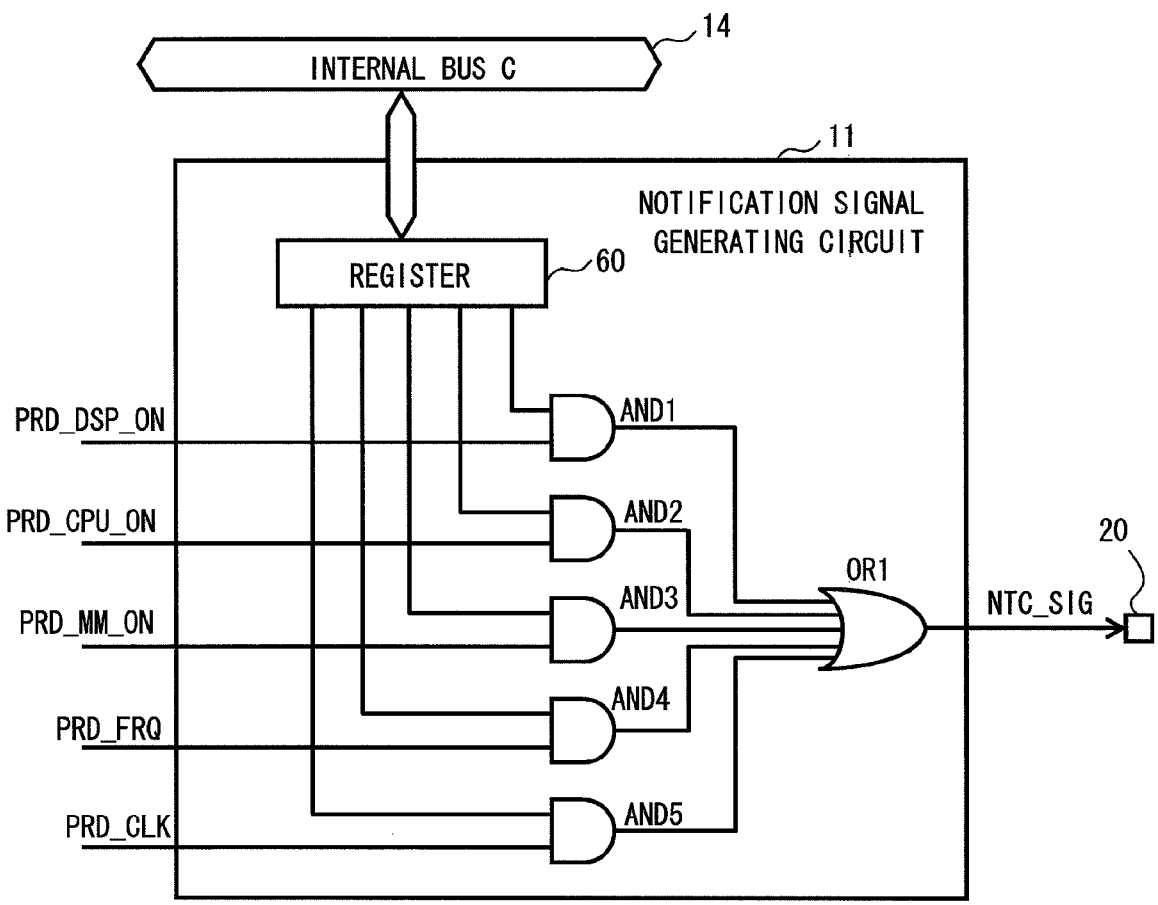
FIG. 5 is a block diagram showing details of the notification signal generating circuit included in the semiconductor apparatus according to the first embodiment.

That is, the notification signal generating circuit 11 generates the notification signal NTC_SIG according to the signals PRD_DSP_ON, PRD_CPU_ON, and PRD_MM_ON output from the internal power control circuit 8, and signals the PRD_CLK and PRD_FRQ output from the clock control circuit 9, and outputs the generated notification signal NTC_SIG to a terminal 20. FIG. 5 is a block diagram showing details of the notification signal generating circuit 11. As shown in FIG. 5, the notification signal generating circuit 11 includes a register 60, an AND1 to an AND5, and an OR1.

A signal output from the register 60 is supplied to one input of the AND1, and the signal PRD_DSP_ON output from the internal power control circuit 8 is supplied to the other input, and an output from the AND1 is supplied to the OR1. A signal output from the register 60 is supplied to one input of the AND2, and the signal PRD_CPU_ON output from the internal power control circuit 8 is supplied to the other input, and an output from the AND2 is supplied to the OR1. A signal output from the register 60 is supplied to one input of the AND3, and the signal PRD_MM_ON output from the internal power control circuit 8 is supplied to the other input, and an output from the AND3 is supplied to the OR1. A signal output from the register 60 is supplied to one input of the AND4, and the signal PRD_FRQ output from the internal power control circuit 8 is supplied to the other input, and an output from the AND4 is supplied to the OR1. A signal output from the register 60 is supplied to one input of the AND5, and the signal PRD_CLK output from the internal power control circuit 8 is supplied to the other input, and an output from the AND5 is supplied to the OR1. The OR1 outputs logical OR of the signals output from the AND1 to the AND5 as the notification signal NTC_SIG.

The information concerning whether or not to allow the AND1 to the AND5 to output the signal corresponding to the notification signal NTC_SIG is stored in the register 60. For example, the state machine (PWR) 32 of the internal power control circuit 8 outputs a signal in an active state (typically the signal is a high-level signal and the high-level signal is hereinafter explained as the signal in the active state) as the signal PRD_DSP_ON to the other input of the AND1 while the state machine (PWR) 32 is performing the power supply process to the DSP (3). Then, when the AND1 is allowed to output the signal corresponding to the notification signal NTC_SIG, the register 60 is set so that a high-level signal is supplied to one input of the AND1. In this case, the AND1 outputs the high-level signal to the OR1 while the signal PRD_DSP_ON is high level. At this time, the high-level notification signal NTC_SIG is output from the OR1.

On the other hand, when the AND1 is not allowed to output the signal corresponding to the notification signal NTC_SIG, the register 60 is set so that a low-level signal is supplied to one input of the AND1. In this case, even when the signal PRD_DSP_ON is high level, the AND1 outputs the low-level signal to the OR1. Accordingly, the signal corresponding to the notification signal NTC_SIG is not output from the AND1. This also applies to the AND2 to AND5.

That is, by providing the register 60 and the AND1 to the AND5, a signal can be selected from the signals PRD_DSP_ON, PRD_CPU_ON, PRD_MM_ON, PRD_FRQ, and PRD_CLK to use as an element for generating the notification signal NTC_SIG. The information concerning whether or not to allow the AND1 to the AND5 to output the signal corresponding to the notification signal NTC_SIG can be written by the CPU (4) accessing the register 60 via the internal bus A (12) and the internal bus C (14), for example.

Power Supply Apparatus

Next, the power supply apparatus 2 is explained. The power supply apparatus 2 includes a regulator 21 and a voltage setting circuit 22. The power supply apparatus 2 is an LSI for power supply, for example. The regulator 21 can adjust the voltage output to a terminal 24 according to a control signal output from the voltage setting circuit 22. The power supply output from the regulator 21 is supplied to the terminal 17 (VDD_IN) of the semiconductor apparatus 1 via the terminal 24.

The voltage setting circuit 22 adjusts the voltage output from the regulator 21 according to the notification signal NTC_SIG supplied to a terminal 23 from the terminal 20 of the semiconductor apparatus 1. Specifically, when the notification signal NTC_SIG is low level, the voltage setting circuit 22 sets the voltage of the regulator 21 so that a normally set voltage is output from the regulator 21. On the other hand, when the notification signal NTC_SIG is high level (that is, in the period including a period in which an operating current increases in the semiconductor apparatus 1), the voltage setting circuit 22 sets the voltage of the regulator 21 so that the voltage output from the regulator 21 will be higher than the normally set voltage. For example, the voltage setting circuit 22 sets the voltage of the regulator 21 so that the voltage as high as the semiconductor apparatus 1 to normally operate is output from the regulator 21 in the period when the notification signal NTC_SIG is high level. Further, a bypass capacitor C1 is provided between the terminal 17 of the semiconductor apparatus 1 and the terminal 24 of the power supply apparatus 2.

Note that the semiconductor apparatus 1 and the power supply apparatus 2 may be formed on the same chip or may be formed on different chips. When the semiconductor apparatus 1 and the power supply apparatus 2 are formed on different chips, the terminal 20 of the semiconductor chip (semiconductor apparatus 1) is an external terminal for connecting to an external chip (power supply apparatus 2).

Operation Example A of the Semiconductor Apparatus

Figure 6:
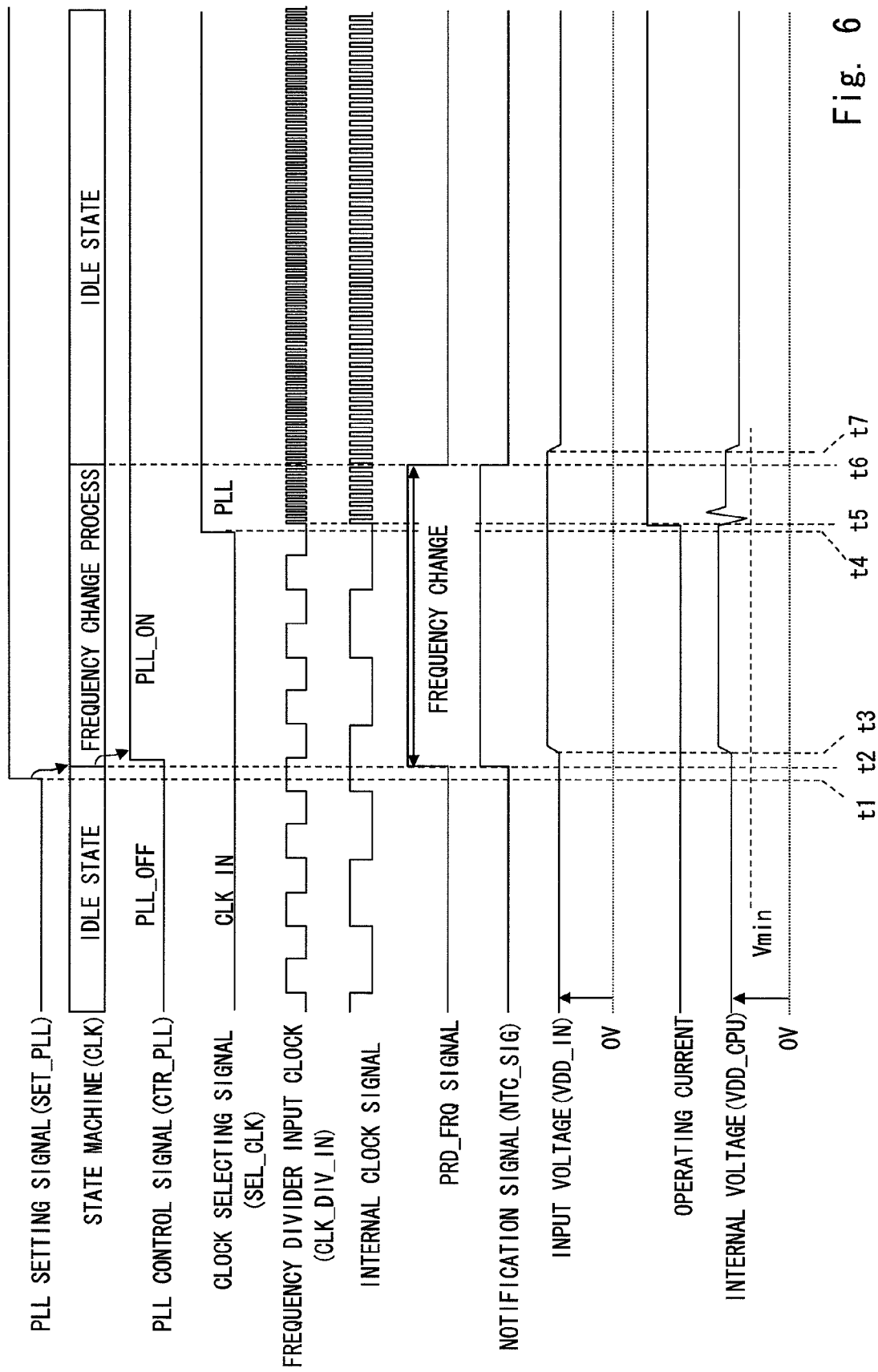
FIG. 6 is a timing chart showing an operation of the semiconductor apparatus according to the first embodiment.

Next, an operation example of the semiconductor apparatus 1 according to this embodiment is explained. FIG. 6 is a timing chart showing an operation of the semiconductor apparatus 1 according to this embodiment. The timing chart shown in FIG. 6 illustrates a case in which the internal clock signal of the semiconductor apparatus 1 changes from low speed and high speed.

The low-level PLL setting signal SET_PLL is output from the register 41 of the clock control circuit 9 before the timing t1. As the PLL control signal CTR_PLL is low level at this time, the PLL circuit 51 of the clock generating circuit 10 is turned off. Since the clock selecting signal SEL_CLK is low level, the selector 52 selects the input clock signal CLK_IN and outputs the input clock signal CLK_IN to the frequency divider 53 as the frequency divider input clock signal CLK_DIV_IN. The frequency divider 53 divides the frequency of the frequency divider input clock signal CLK_DIV_IN (for example, the frequency division ratio shall be two). Then, the frequency-divided signal is supplied to the internal circuit of the semiconductor apparatus 1 as the internal clock signal. In the example shown in FIG. 6, the power of the CPU (4) is turned on, and the power of the DSP (3) and the multimedia circuit 5 is turned off. Note that in this case, since the internal clock signal is low speed, the semiconductor apparatus 1 is in a sleep state.

After that, when an instruction for switching the internal clock signal from low speed to high speed is written to the register 41 of the clock control circuit 9, the register 41 outputs the high-level PLL setting signal SET_PLL to the state machine (CLK) 44.

The state machine (CLK) 44 receives the high-level PLL setting signal SET_PLL and at the timing t2 and transitions from the idle state to the clock frequency change process. At this time, the state machine (CLK) 44 outputs the high-level signal PRD_FRQ indicating the period of performing the clock frequency change process to the notification signal generating circuit 11. The notification signal generating circuit 11 receives the high-level signal PRD_FRQ and outputs the high-level notification signal NTC_SIG to the terminal 20. At this time, the high-level signal is supplied from the register 60 to one input of the AND4 shown in FIG. 5.

The high-level notification signal NTC_SIG output to the terminal 20 is supplied to the voltage setting circuit 22 via the terminal 23 of the power supply apparatus 2. Then, the voltage setting circuit 22 sets the voltage of the regulator 21 so that the voltage output from the regulator 21 will be higher than the normally set voltage at the timing t3. Then the input voltage VDD_IN of the semiconductor apparatus 1 increases. At this time, the voltage setting circuit 22 sets the voltage of the regulator 21 so that the internal voltage at the time of voltage drop in the semiconductor apparatus 1 caused when the internal clock signal changes from low speed to high speed will be higher than a minimum operating voltage Vmin of the semiconductor apparatus 1. The minimum operating voltage Vmin of the semiconductor apparatus 1 is a minimum value of the voltage on which an element (for example, a transistor) which composes the internal circuit of the semiconductor apparatus 1 normally operates.

The state machine (CLK) 44, which transitioned from the idle state to the clock frequency change process at the timing t2, outputs the high-level PLL control signal CTR_PLL to the PLL circuit 51 in order to perform the clock frequency change process. Accordingly, the PLL circuit 51 is turned on. Then, at the timing t4 after a predetermined time since the PLL circuit 51 is turned on and the PLL circuit 511 is stabilized, the state machine (CLK) 44 outputs the high-level clock selecting signal SEL_CLK to the selector 52. The selector 52 receives the high-level clock selecting signal SEL_CLK and selects an output from the PLL circuit 51.

After that, the internal clock signal of the semiconductor apparatus 1 becomes a high-speed clock signal (a clock signal with a higher frequency than the predetermined frequency) at the timing t5. As the internal clock signal of the semiconductor apparatus 1 becomes the high-speed clock signal, the operating current of the semiconductor apparatus 1 (operating current of the CPU (4) in the example of FIG. 6) increases. The increase in the operating current reduces the internal voltage of the semiconductor apparatus 1 (the power supply voltage VDD_CPU in the CPU (4) in the example of FIG. 6). However, as the input voltage VDD_IN of the semiconductor apparatus 1 is set higher than the normally set voltage, the internal voltage VDD_CPU of the semiconductor apparatus 1 will not be less than or equal to the minimum operating voltage Vmin of the semiconductor apparatus 1. Accordingly, the semiconductor apparatus 1 can normally operate.

The clock frequency change process of the state machine (CLK) 44 is completed and the state machine (CLK) 44 enters the idle state at the timing t6. As the clock frequency change process is completed at this time, the state machine (CLK) 44 outputs the low-level signal PRD_FRQ to the notification signal generating circuit 11. The notification signal generating circuit 11 receives the low-level signal PRD_FRQ and outputs the low-level notification signal NTC_SIG to the terminal 20.

Since the notification signal NTC_SIG falls to low level, the voltage setting circuit 22 of the power supply apparatus 2 sets the voltage of the regulator 21 so that the voltage output from the regulator 21 will be the normally set voltage at the timing t7. Accordingly, the input voltage VDD_IN of the semiconductor apparatus 1 will be the normal voltage.

Operation Example B of the Semiconductor Apparatus

Figure 7:
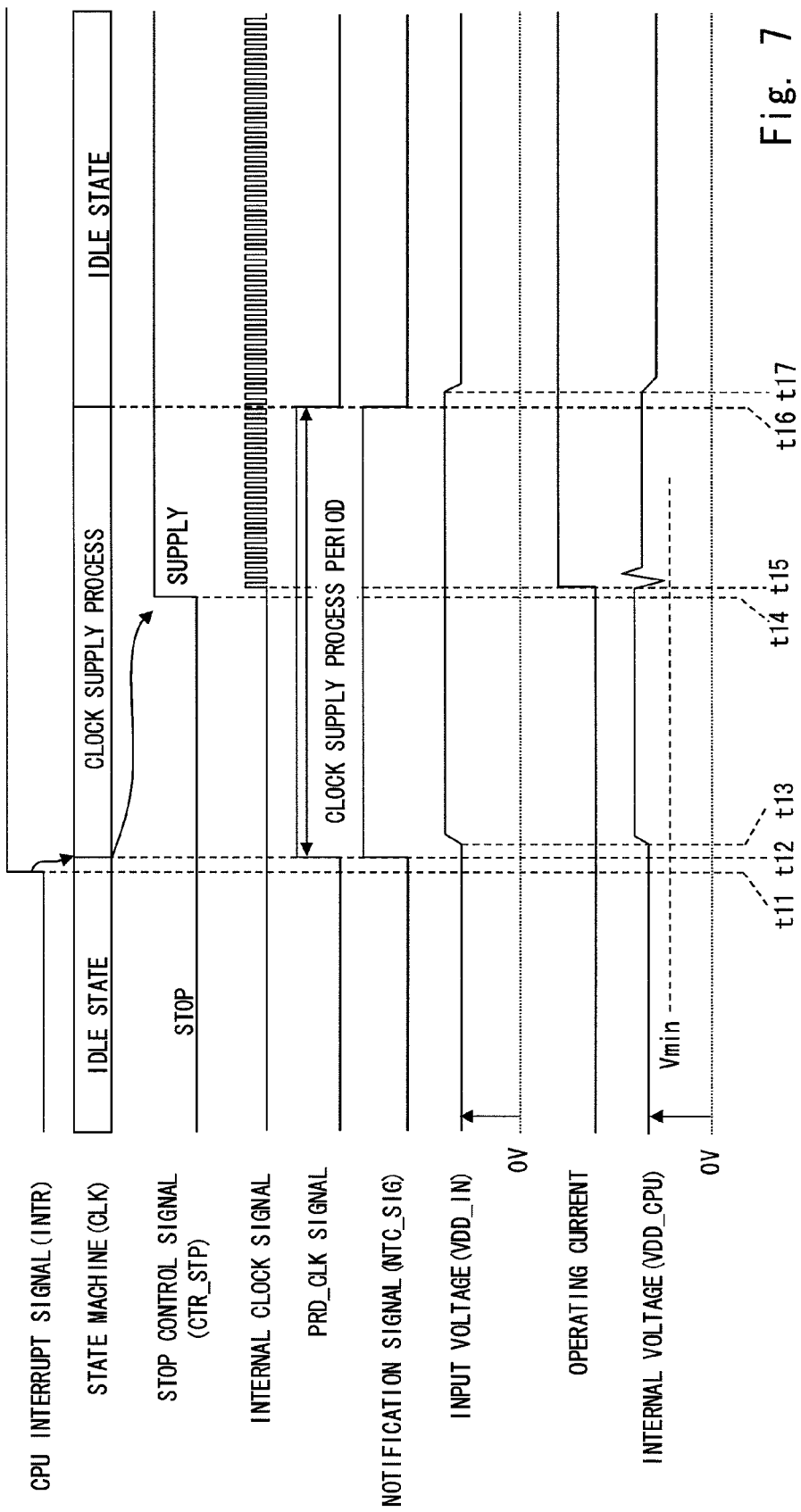
FIG. 7 is a timing chart showing an operation of the semiconductor apparatus according to the first embodiment.

Next, another operation example of the semiconductor apparatus 1 according to this embodiment is explained. FIG. 7 is a timing chart showing an operation of the semiconductor device according to this embodiment. The timing chart shown in FIG. 7 illustrates the case in which the internal clock signal of the semiconductor apparatus 1 returns from the stop state to the supply state. Note that in this case, in the initial state before the timing t11, the PLL circuit 51 is turned on, and the selector 52 selects the output from the PLL circuit 51, and the frequency divider 53 outputs the high-speed clock signal to the stop control circuit 54. However, since the stop control signal CTR_STP is low level, the stop control circuit 54 does not supply the clock signal output from the frequency divider 53 to the internal circuit of the semiconductor apparatus 1. Accordingly, although the PLL circuit 51 is turned on in the initial state, as the internal clock signal is not supplied to the CPU (4), the CPU (4) is in the sleep state.

When the CPU interrupt signal INTR rises to high level at the timing t11, the state machine (CLK) 44 transitions from the idle state to the clock supply process at the timing t12. At this time, the state machine (CLK) 44 outputs the high-level signal PRD_CLK indicating the period of performing the clock supply process to the notification signal generating circuit 11. The notification signal generating circuit 11 receives the high-level signal PRD_CLK and outputs the high-level notification signal NTC_SIG to the terminal 20. At this time, the high-level signal is supplied from the register 60 to one input of the AND5 shown in FIG. 5.

The high-level notification signal NTC_SIG output to the terminal 20 is supplied to the voltage setting circuit 22 via the terminal 23 of the power supply apparatus 2. Then, the voltage setting circuit 22 sets the voltage of the regulator 21 so that the voltage output from the regulator 21 will be higher than the normally set voltage at the timing t13. Accordingly, the input voltage VDD_IN of the semiconductor apparatus 1 increases.

Then, the state machine (CLK) 44 outputs the high-level stop control signal CTR_STP to the stop control circuit 54 of clock the generating circuit 10 at the timing t14 in order to perform the clock supply process. When the stop control signal CTR_STP rises to high level, the stop control circuit 54 supplies the internal clock signal output from the frequency divider 53 to the internal circuit of the semiconductor apparatus 1 including the CPU (4) at the timing t15. When the internal clock signal is supplied to the CPU (4), the operating current of the CPU (4) increases. The increase in the operating current reduces the internal voltage VDD_CPU of the CPU (4). However, as the input voltage VDD_IN of the semiconductor apparatus 1 is set to the higher voltage than the normally set voltage at this time, the internal voltage VDD_CPU of the CPU (4) will not be less than or equal to the minimum operating voltage Vmin of the CPU (4). Accordingly, the CPU (4) can normally operate.

The clock supply process of the state machine (CLK) 44 is completed and the state machine (CLK) 44 enters the idle state at the timing t16. Since the clock supply process is completed, the state machine (CLK) 44 outputs the low-level signal PRD_CLK to the notification signal generating circuit 11 at this time. The notification signal generating circuit 11 receives the low-level signal PRD_CLK and outputs the low-level notification signal NTC_SIG to the terminal 20.

As the notification signal NTC_SIG falls to low level, the voltage setting circuit 22 of the power supply apparatus 2 sets the voltage of the regulator 21 so that the voltage output from the regulator 21 will be the normally set voltage at the timing t17. Accordingly, the input voltage VDD_IN of the semiconductor apparatus 1 will be the normal voltage.

Comparative Example A

Figure 8:
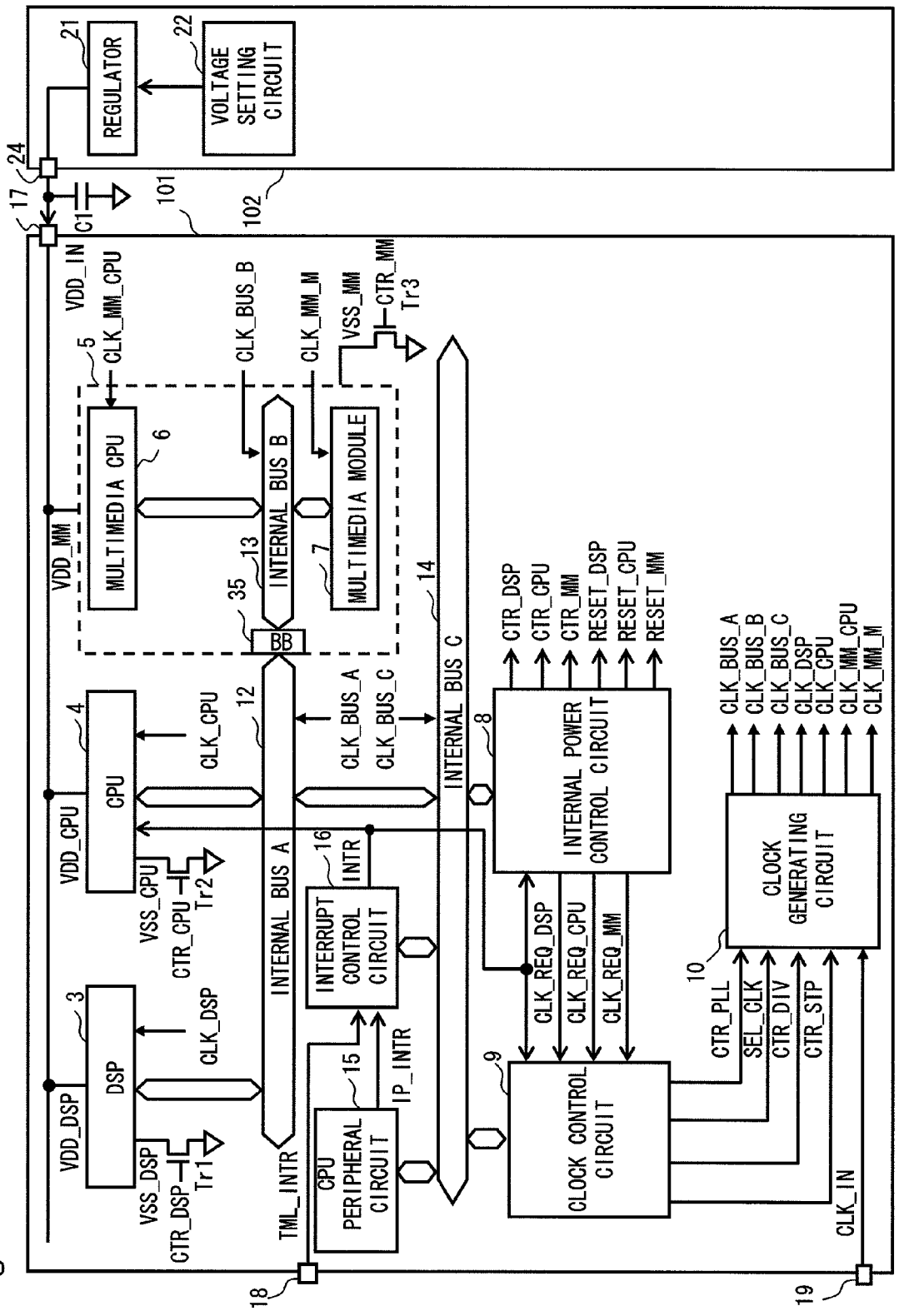
FIG. 8 is a block diagram showing a comparative example of the system including the semiconductor apparatus and the power supply apparatus.
Figure 9:
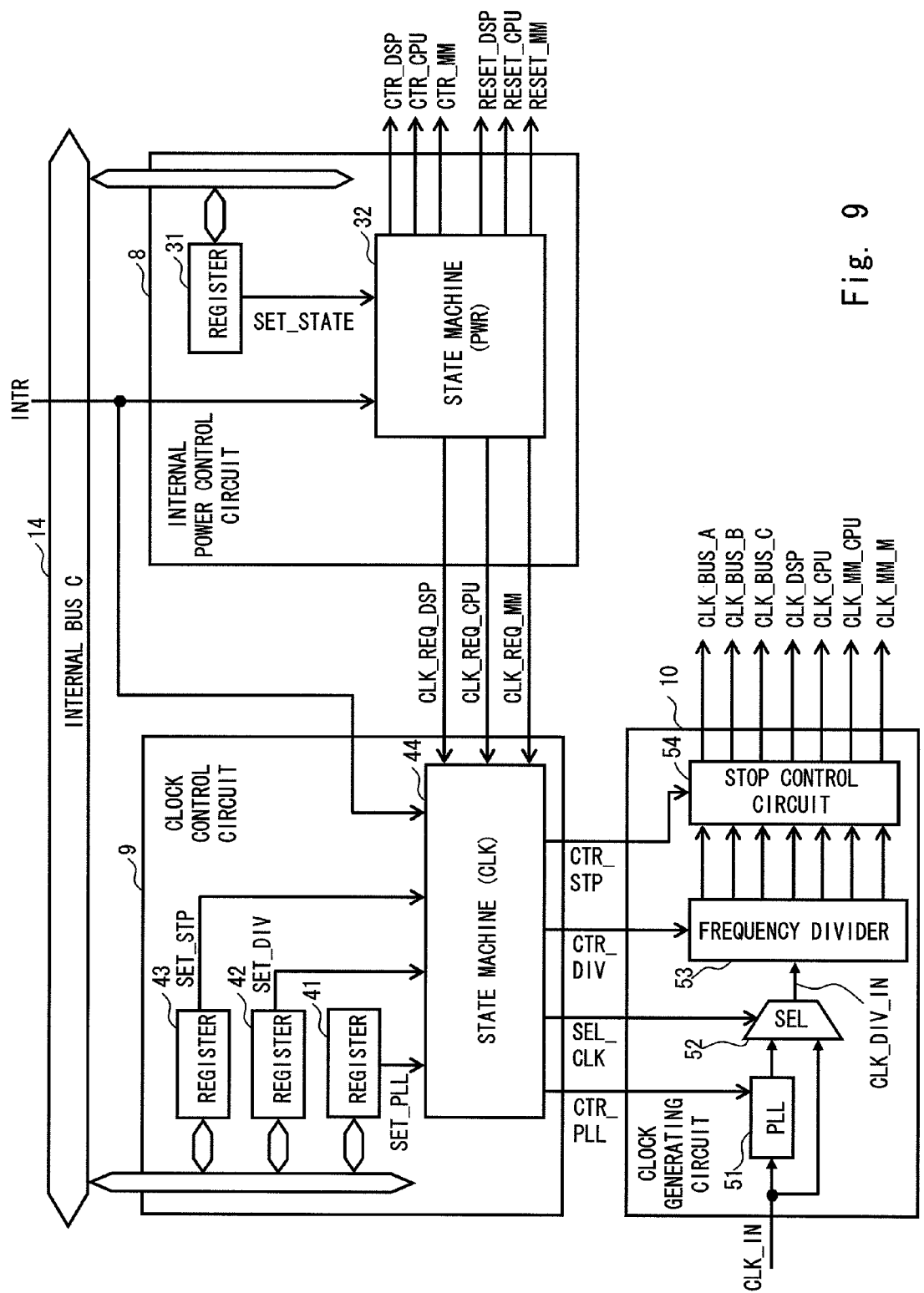
FIG. 9 is a block diagram showing details of the internal power control circuit, the clock control circuit, and the clock generating circuit included in the semiconductor apparatus shown in FIG. 8.

Next, a comparative example of the present invention according to this embodiment is explained. FIG. 8 is a block diagram showing the comparative example of a system including a semiconductor apparatus and a power supply apparatus. FIG. 9 is a block diagram showing details of an internal power control circuit 8, a clock control circuit 9, and a clock generating circuit 10 included in a semiconductor apparatus 101 shown in FIG. 8. The system including the semiconductor apparatus 101 and a power supply apparatus 102 shown in FIGS. 8 and 9 is different from the system including the semiconductor apparatus 1 and the power supply apparatus 2 according to this embodiment shown in FIG. 3 in the point that the notification signal generating circuit 11 is not included and the voltage setting circuit 22 does not set the voltage of the regulator 21 based on the notification signal NTC_SIG. Other points are same as the system including the semiconductor apparatus 1 and the power supply apparatus 2 shown in FIG. 3. Thus the same components are denoted by the same numerals and repeated explanation is omitted. Accordingly, since the semiconductor apparatus 101 shown in FIG. 8 does not include the notification signal generating circuit 11, the semiconductor apparatus 101 cannot generate the notification signal NTC_SIG for notifying the increase in the internal voltage.

Figure 10:
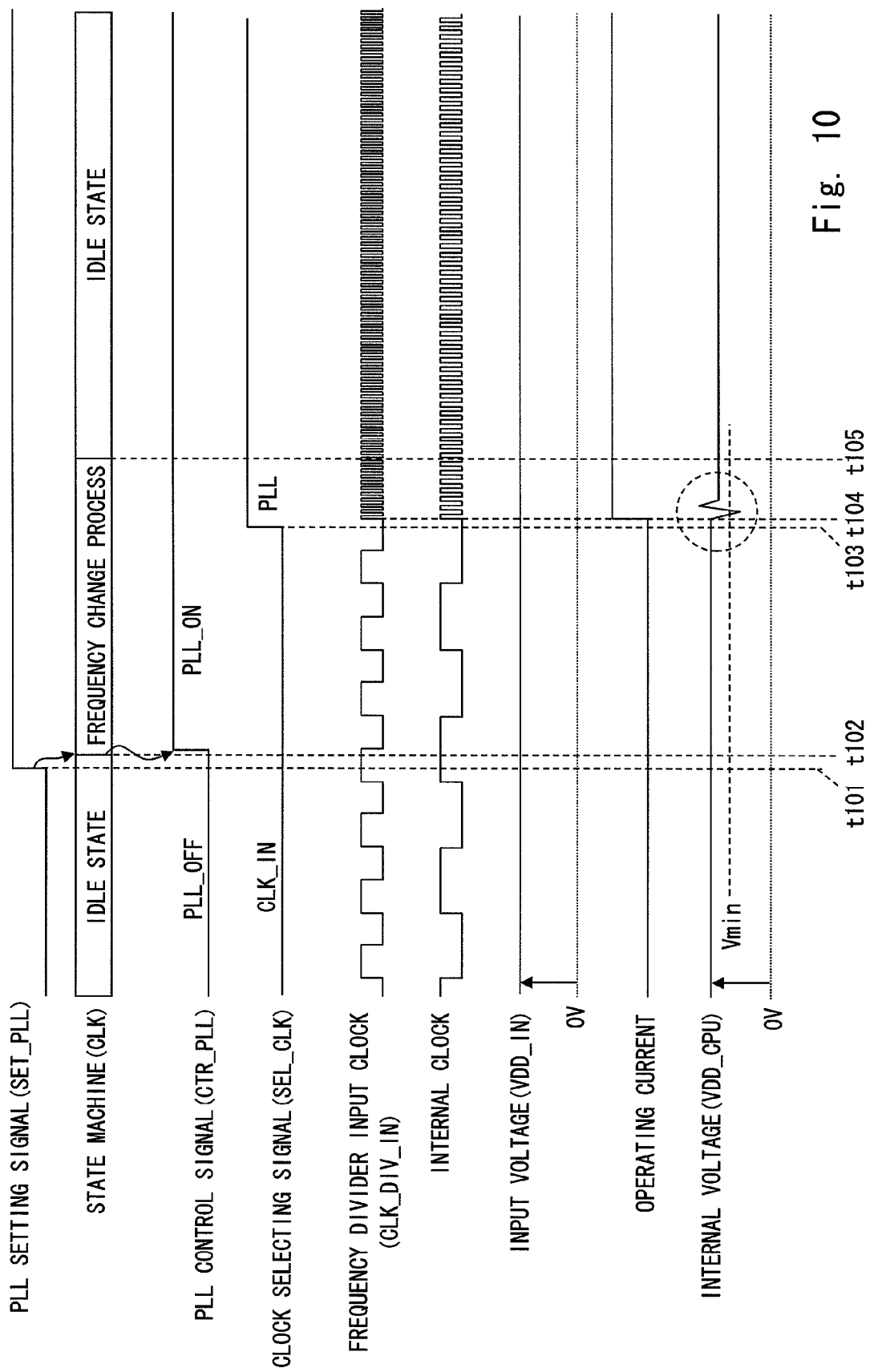
FIG. 10 is a timing chart showing an operation of the semiconductor apparatus shown in FIG. 8.

First, an operation example of the semiconductor apparatus 101 shown in FIG. 8 is explained as the comparative example of the present invention according to this embodiment. FIG. 10 is a timing chart showing an operation of the semiconductor apparatus 101 shown in FIG. 8. The timing chart shown in FIG. 10 illustrates the case in which an internal clock signal of the semiconductor apparatus 101 changes from low speed to high speed. The timing chart shown in FIG. 10 corresponds to the timing chart shown in FIG. 6, and is different from the timing chart shown in FIG. 6 in the point that the notification signal NTC_SIG is not generated and the input voltage VDD_IN is not set to the higher voltage than the normally set voltage.

As the PLL control signal CTR_PLL is low level in a similar manner as the case shown in FIG. 6 before the timing t101 shown in FIG. 10, the PLL circuit 51 of the clock generating circuit 10 is turned off. Further, since the clock selecting signal SEL_CLK is low level, the selector 52 selects the input clock signal CLK_IN and outputs the input clock signal CLK_IN to the frequency divider 53 as the frequency divider input clock signal CLK_DIV_IN. The frequency divider 53 divides the frequency of the divider input clock signal CLK_DIV_IN (for example, the frequency division ratio shall be two). Then, the frequency-divided signal is supplied to the internal circuit of the semiconductor apparatus 101 as the internal clock signal. Note that in this case, since the internal clock signal is low speed, the semiconductor apparatus 101 is in the sleep state.

Then, the register 41 outputs the high-level PLL setting signal SET_PLL to the state machine (CLK) 44 at the timing t101. The state machine (CLK) 44 transitions from the idle state to the clock frequency change process at the timing t102. The state machine (CLK) 44, which transitioned to the clock frequency change process, outputs the high-level PLL control signal CTR_PLL to the PLL circuit 51 in order to perform the clock frequency change process. Accordingly, the PLL circuit 51 is turned on. Then, at the timing t103 after a predetermined time since the PLL circuit 51 is turned on and the PLL circuit 51 is stabilized, the state machine (CLK) 44 outputs the high-level clock selecting signal SEL_CLK to the selector 52. The selector 52 receives the high-level clock selecting signal SEL_CLK and selects the output from the PLL circuit 51.

After that, the internal clock signal of the semiconductor apparatus 101 will be a high-speed clock signal at the timing t104. As the internal clock signal of the semiconductor apparatus 101 becomes the high-speed clock signal, the operating current of the CPU (4) increases. The increase in the operating current reduces the internal voltage VDD_CPU of the CPU (4). Therefore, the internal voltage VDD_CPU of the CPU (4) will temporarily be less than or equal to the minimum operating voltage Vmin of the CPU (4), and then the operation of the CPU (4) will be unstable.

After that, the clock frequency change process of the state machine (CLK) 44 is completed and the state machine (CLK) 44 enters the idle state at the timing t105.

Comparative Example B

Figure 11:
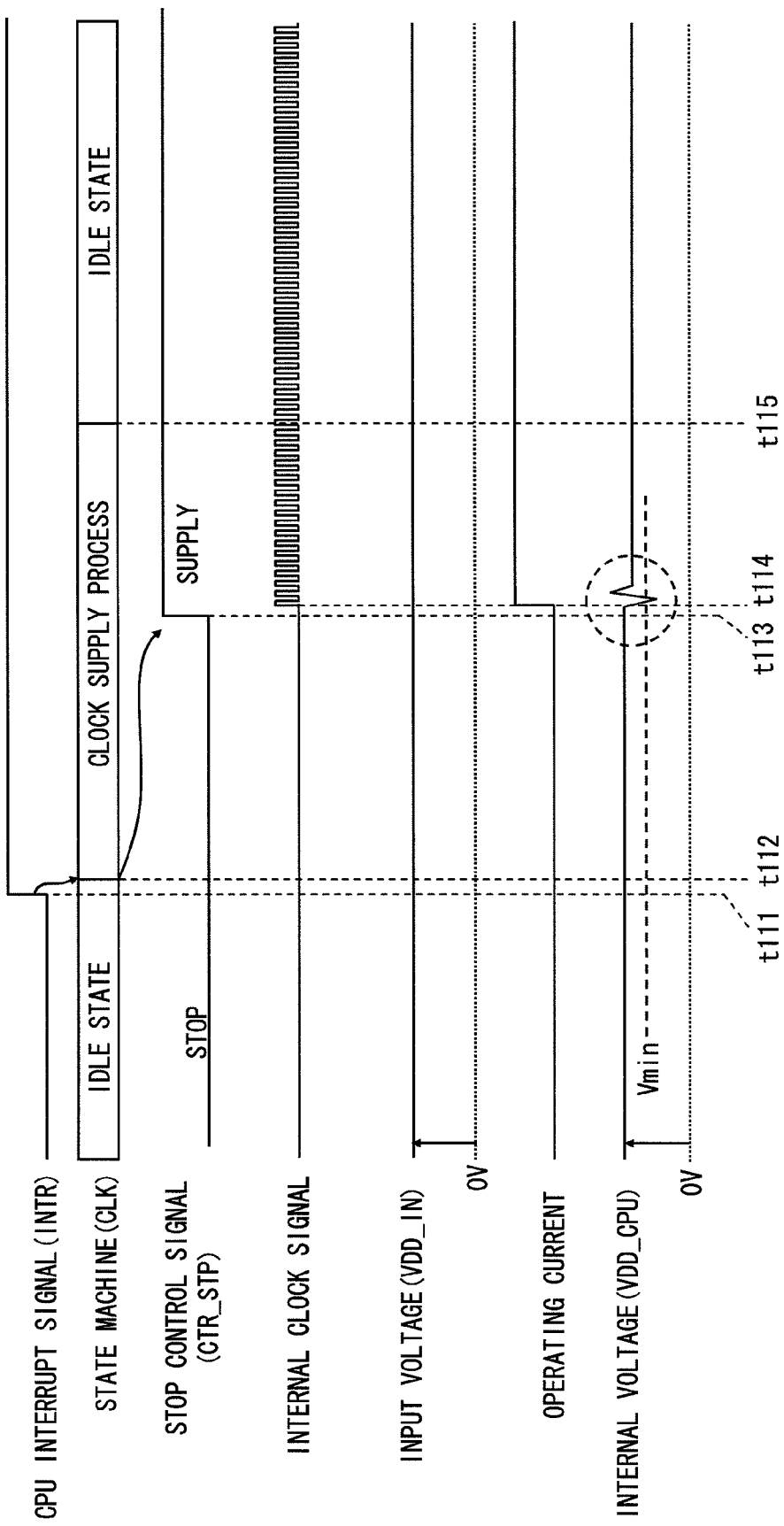
FIG. 11 is a timing chart showing an operation of the semiconductor apparatus shown in FIG. 8.

Next, another operation example of the semiconductor apparatus 101 shown in FIG. 8 is explained as a comparative example of the present invention according to this embodiment. FIG. 11 is a timing chart showing an operation of the semiconductor apparatus 101 shown in FIG. 8. The timing chart shown in FIG. 11 illustrates the case in which the internal clock signal of the semiconductor apparatus 101 returns to the supply state from the suspended state. Note that the timing chart shown in FIG. 11 corresponds to the timing chart shown in FIG. 7, and is different from the timing chart shown in FIG. 7 in the point that the notification signal NTC_SIG is not generated and the point that the input voltage VDD_IN is not set to the higher voltage than the normally set voltage.

In the example shown in FIG. 11, in the initial state before the timing t111, the PLL circuit 51 is turned on, the selector 52 selects the output from the PLL circuit 51, and the frequency divider 53 outputs the high-speed clock signal to the stop control circuit 54. However, since the stop control signal CTR_STP is low level, the stop control circuit 54 does not supply the clock signal output from the frequency divider 53 to the internal circuit of the semiconductor apparatus 101. Accordingly, although the PLL circuit 51 is turned on in the initial state, as the internal clock signal is not supplied to the CPU (4), the CPU (4) is in the sleep state.

When the CPU interrupt signal INTR rises to high level at the timing t111, the state machine (CLK) 44 transitions from the idle state to the clock supply process at the timing t112. Then, the state machine (CLK) 44 outputs the high-level stop control signal CTR_STP to the stop control circuit 54 of the clock generating circuit 10 in order to perform the clock supply process.

When the stop control signal CTR_STP rises to high level, the stop control circuit 54 supplies the internal clock signal output from the frequency divider 53 to the internal circuit of the semiconductor apparatus 101 including the CPU (4) at the timing t114. When the internal clock signal is supplied to the CPU (4), the operating current of the CPU (4) increases. The increase in the operating current reduces the internal voltage VDD_CPU of the CPU (4). Therefore, the internal voltage VDD_CPU of the CPU (4) will temporarily be less than or equal to the minimum operating voltage Vmin of the CPU (4), and then the operation of the CPU (4) will be unstable.

After that, the clock supply process of the state machine (CLK) 44 is completed and the state machine (CLK) 44 enters the idle state at the timing t115.

In the system including the semiconductor apparatus 101 and the power supply apparatus 102 shown in FIG. 8, providing the bypass capacitor C1 between the terminals 17 and 24, for example, enables the system to deal with a rapid increase in the operating current of the semiconductor apparatus 101. However, there is a problem in the semiconductor apparatus 101 shown in FIG. 8 that an influence of a resistance component and an inductance component in the internal circuit of the semiconductor apparatus 101 (especially an influence of the resistance component and the inductance component in the wiring between each of the DSP (3), the CPU (4), and the multimedia circuit 5 and the terminal 17) causes a delay until the amount of power supply increases after the rapid increase in the operating current.

Further, as for the rapid increase in the operating current of the semiconductor apparatus 101, for example after the rapid increase in the operating current of the semiconductor apparatus 101 is detected, increasing the power supply to the power supply apparatus 102 temporarily increases the amount of current supply and enables dealing with the rapid increase in the operating current. That is, the power supply apparatus may have a first operating state with small current supply ability and small power consumption of the power supply apparatus itself and a second operating mode with large current supply ability and larger power consumption of the power supply apparatus itself as compared to that of the first operating state. When the operating current increases in the semiconductor apparatus, the power supply apparatus can automatically switch from the first operating state to the second operating state.

However, the power supply apparatus transitions from the first operating state to the second operating state after the increase in the operating current is detected in the semiconductor apparatus. Therefore, there has been a problem that when it takes time to detect the operating current and to supply power to the semiconductor apparatus from the power supply apparatus after the detection, the power cannot be supplied to the semiconductor apparatus in time.

As described so far, in the case in which the operating current rapidly increases in the semiconductor apparatus, when the amount of power supply to the semiconductor apparatus is not increased in a predetermined time, there is a large voltage drop in the internal circuit of the semiconductor apparatus. Then, there has been a problem that when this voltage drop causes the input voltage of the semiconductor apparatus to decrease lower than the minimum operating voltage Vmin of the transistor, the semiconductor apparatus malfunctions.

On the other hand, in the semiconductor apparatus 1 according to this embodiment, the notification signal generating circuit 11 is included that generates the notification signal NTC_SIG for notifying that the operating current increases in the internal circuit of the semiconductor apparatus 1. Therefore, the increase in the operating current can be detected beforehand in the internal circuit of the semiconductor apparatus 1. Accordingly, even when the operating current of the semiconductor apparatus rapidly increases, the power supplied to the semiconductor apparatus 1 can be increased without delay. Further, outputting the notification signal NTC_SIG from the terminal 20 enables the power supply apparatus 2 provided outside to be notified of the increase in the operating current of the semiconductor apparatus 1. Furthermore, the voltage setting circuit 22 is provided in the power supply apparatus 2 for setting the voltage of the regulator 21 to be high while the notification signal NTC_SIG is in the active state, thereby increasing the input voltage of the semiconductor apparatus 1 only when it is necessary.

The notification signal generating circuit 11 of the semiconductor apparatus 1 according to this embodiment can generate the notification signal NTC_SIG according to the process of the state machine (CLK) 44 of the clock control circuit 9. That is, the notification signal NTC_SIG in the active state can be generated in synchronization with the clock frequency change process (process for changing the internal clock signal in the semiconductor apparatus 1 from low speed to high speed) and the clock supply process (process for starting to supply the internal clock signal to the semiconductor apparatus 1) of the state machine (CLK) 44. As described above, generating the notification signal NTC_SIG in the active state according to the process of the state machine (CLK) 44 enables correct and easy generation of the notification signal NTC_SIG.

The present invention according to this embodiment described above can provide a semiconductor apparatus and a system including the semiconductor apparatus that can achieve stable operation.

Second Embodiment

Next, a second embodiment of the present invention is explained. The first embodiment explained the operation in the case of controlling the supply of the internal clock signal using the clock control circuit 9 of the semiconductor apparatus 1 (see FIGS. 6 and 7). This embodiment explains the case of controlling the power of the DSP (3), the DPU (4), and the multimedia circuit 5 using the internal power control circuit 8 while controlling the supply of the internal clock signal using the clock control circuit 9 of the semiconductor apparatus 1. Note that as the system including the semiconductor apparatus and the power supply apparatus used in this embodiment is the same as the system including the semiconductor apparatus 1 and the power supply apparatus 2 explained in the first embodiment (FIGS. 3 to 5), repeated explanation is omitted.

Operation Example C of the Semiconductor Apparatus

An operation example of the semiconductor apparatus 1 according to this embodiment is explained. FIG. 12 is a timing chart showing an operation of the semiconductor apparatus according this embodiment. The timing chart shown in FIG. 12 shows the case in which the internal power control circuit 8 turns on the power of the CPU (4), and further the clock control circuit 9 switches the internal clock signal from the stopped state to the supply state.

In the initial state before the timing t21, the PLL circuit 51 is turned on, the selector 52 selects the output from the PLL circuit 51, and the frequency divider 53 outputs the high-speed clock signal to the stop control circuit 54. However, since the stop control signal CTR_STP is low level, the stop control circuit 54 does not supply the clock signal output from the frequency divider 53 to the internal circuit of the semiconductor apparatus 1.

When the CPU interrupt signal INTR rises to high level at the timing t21, the state machine (CLK) 44 transitions from the idle state to the clock supply process at the timing t22. At this time, the state machine (CLK) 44 outputs the high-level signal PRD_CLK indicating the period of performing the clock supply process to the notification signal generating circuit 11. Further, when the CPU interrupt signal INTR rises to high level at the timing t21, the state machine (PWR) 32 transitions from the idle state to the power supply process at the timing t22. At this time, the state machine (PWR) 32 outputs the high-level signal PRD_CPU_ON indicating the period of performing the power supply process to the notification signal generating circuit 11.

The notification signal generating circuit 11 receives the high-level signal PRD_CLK and the signal PRD_CPU_ON, and outputs the high-level notification signal NTC_SIG to the terminal 20. At this time, the high-level signal is respectively supplied from the register 60 to one input of the AND2 and one input of the AND5 which are shown in FIG. 5.

The high-level notification signal NTC_SIG output to the terminal 20 is supplied to the voltage setting circuit 22 via the terminal 23 of the power supply apparatus 2. Then, the voltage setting circuit 22 sets the voltage of the regulator 21 so that the voltage output from the regulator 21 will be higher than the normal set voltage at the timing t23. Accordingly, the input voltage VDD_IN of the semiconductor apparatus 1 increases.

Note that FIG. 12 explained the case in which the timing for the state machine (CLK) 44 to transition to the clock supply process is simultaneous (at the timing t22) as the timing for the state machine (PWR) 32 to transition to the power supply process. However, those timings may be different from each other. In this case, between the state machine (CLK) 44 and the state machine (PWR) 32, at the timing when the state machine which transitions first outputs the high-level signal to the notification signal generating circuit 11, the high-level notification signal NTC_SIG is output from the notification signal generating circuit 11.

The state machine (PWR) 32, which transitioned to the power supply process at the timing t22, outputs the high-level clock request signal CLK_REQ_CPU to the state machine (CLK) 44 of the clock control circuit 9 so that the clock signal CLK_CPU is supplied to the CPU (4). Further, the state machine (PWR) 32 outputs the high-level control signal CTR_CPU to the gate of the transistor Tr2 connected to the CPU (4) in order to turn on the power of the CPU (4). When the high-level control signal CTR_CPU is supplied, a low-side power supply potential VSS_CPU of the CPU (4) gradually starts decreasing from the timing t24 and will be an operational potential VSS after a predetermined time. Moreover, the operating current of the CPU (4) gradually starts increasing from the timing t24 when the low-side power supply potential VSS_CPU of the CPU (4) starts decreasing.

The state machine (CLK) 44, which is supplied with the high-level clock request signal CLK_REQ_CPU, outputs the high-level stop control signal CTR_STP to the stop control circuit 54 of the clock generating circuit 10 at the timing t25 in order to perform the clock supply process. When the stop control signal CTR_STP rises to high level, the stop control circuit 54 supplies the clock signal output from the frequency divider 53 to the internal circuit of the semiconductor apparatus 1 including the CPU (4) at the timing t26.

At this time, the state machine (PWR) 32 is asserting the high-level power supply reset signal RESET_CPU to the CPU (4) so that the CPU (4) does not malfunction. During reset, all clock gating of the CPU (4) is canceled, for example, and the internal clock signal is supplied to all flip-flops for initialization. Therefore, the operating current of the CPU (4) increases. The increase in the operating current reduces the internal voltage VDD_CPU of the CPU (4). However, as the input voltage VDD_IN of the semiconductor apparatus 1 is set to the voltage higher than the normally set voltage at this time, the internal voltage VDD_CPU of the CPU (4) will not be less than or equal to the minimum operating voltage Vmin of the CPU (4). Accordingly, the CPU (4) is normally initialized.

Then, at the timing t27 when the initialization process of the CPU (4) is completed (that is, after the initialization period), the state machine (PWR) 32 cancels the power supply reset signal RESET_CPU asserted to the CPU (4) (that is, the power supply reset signal RESET_CPU is set to low level). When the power supply reset signal RESET_CPU is set to low level, the state machine (PWR) 32 enters the idle state again. Since the power supply process is completed, the state machine (PWR) 32 outputs the low-level signal PRD_CPU_ON to the notification signal generating circuit 11.

Further, the clock supply process of the state machine (CLK) 44 is completed and the state machine (CLK) 44 enters the idle state at the timing t27. At this time, as the clock supply process is completed, the state machine (CLK) 44 outputs the low-level signal PRD_CLK to the notification signal generating circuit 11.

The notification signal generating circuit 11 receives the low-level signal PRD_CPU_ON and the signal PRD_CLK, and outputs the low-level notification signal NTC_SIG to the terminal 20. Since the notification signal NTC_SIG falls to low level, the voltage setting circuit 22 of the power supply apparatus 2 sets the voltage of the regulator 21 so that the voltage output from the regulator 21 will be higher than the normally set voltage at the timing t28. Accordingly, the input voltage VDD_IN of the semiconductor apparatus 1 will be the normal voltage.

Note that FIG. 12 explained the case in which the timing when the state machine (CLK) 44 transitions to the idle state is simultaneous (at the timing t27) as the timing when the state machine (PWR) 32 transitions to the idle state. However, these timings may be different from each other. In this case, between the state machine (CLK) 44 and the state machine (PWR) 32, at the timing when the state machine which transitions later outputs the low-level signal to the notification signal generating circuit 11, the low-level notification signal NTC_SIG is output from the notification signal generating circuit 11.

Operation Example D of the Semiconductor Apparatus

Figure 13:
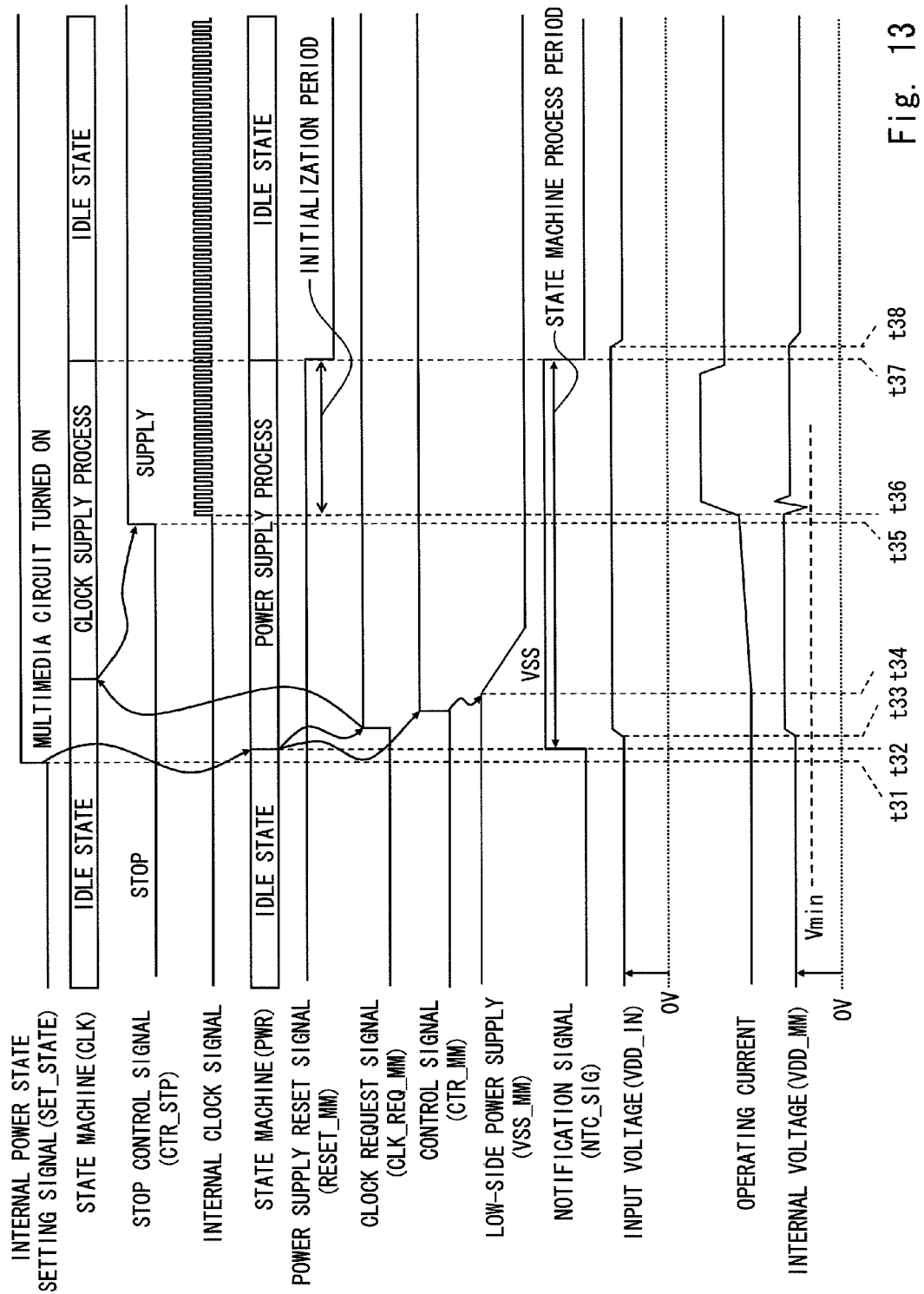
FIG. 13 is a timing chart showing an operation of the semiconductor apparatus according to the second embodiment.

Next, another operation example of the semiconductor apparatus 1 according to this embodiment is explained. FIG. 13 is a timing chart showing an operation of the semiconductor apparatus according to this embodiment. The timing chart shown in FIG. 13 illustrates the case in which the internal power control circuit 8 turns on the power of the multimedia circuit 5, and further the clock control circuit 9 switches the internal clock signal from the stopped state to the supply state.

In the initial state before the timing t31, the PLL circuit 51 is turned on, the selector 52 selects the output from the PLL circuit 51, and the frequency divider 53 outputs the high-speed clock signal to the stop control circuit 54. However, since the stop control signal CTR_STP is low level, the stop control circuit 54 does not supply the clock signal output from the frequency divider 53 to the internal circuit of the semiconductor apparatus 1.

When the internal power state setting signal SET_STATE that turns on the multimedia circuit 5 is supplied at the timing t31, the state machine (PWR) 32 transitions from the idle state to the power supply process at the timing t32. At this time, the state machine (PWR) 32 outputs the high-level signal PRD_MM_ON indicating the period of performing the power supply process to the notification signal generating circuit 11.

The notification signal generating circuit 11 receives the high-level signal PRD_MM_ON and outputs the high-level notification signal NTC_SIG to the terminal 20. At this time, the high-level signal is supplied from the register 60 to one input of the AND3 shown in FIG. 5.

The high-level notification signal NTC_SIG output to the terminal 20 is supplied to the voltage setting circuit 22 via the terminal 23 of the power supply apparatus 2. Then, the voltage setting circuit 22 sets the voltage of the regulator 21 so that the voltage output from the regulator 21 will be higher than the normally set voltage at the timing t33. Accordingly, the input voltage VDD_IN of the semiconductor apparatus 1 increases.

The state machine (PWR) 32, which transitioned to the power supply process at the timing t32, outputs the high-level clock request signal CLK_REQ_MM to the state machine (CLK) 44 of the clock control circuit 9 so that the clock signals CLK_MM_CPU, CLK_MM_M, and CLK_BUS_B are respectively supplied to the multimedia CPU (6), the multimedia module 7, and the internal bus B (13). When the high-level clock request signal CLK_REQ_MM is supplied, the state machine (CLK) 44 transitions from the idle state to the clock supply process. At this time, the state machine (CLK) 44 outputs the high-level signal PRD_CLK indicating the period of performing the clock supply process to the notification signal generating circuit 11. Note that the notification signal generating circuit 11 has already output the high-level notification signal NTC_SIG to the terminal 20 at this point.

Further, the state machine (PWR) 32 outputs the high-level control signal CTR_MM to the gate of the transistor Tr3 connected to the multimedia circuit 5 in order to turn on the power of the multimedia circuit 5. When the high-level control signal CTR_MM is supplied, a low-side power potential VSS_MM of the multimedia circuit 5 gradually starts decreasing from the timing t34 and will be the low-side operational potential VSS after a predetermined time. The operating current of the multimedia circuit 5 gradually starts increasing from the timing t34 when the low-side power supply potential VSS_MM of the multimedia circuit 5 starts decreasing.

The state machine (CLK) 44, which is supplied with the high-level clock request signal CLK_REQ_MM, outputs the high-level stop control signal CTR_STP to the stop control circuit 54 of the clock generating circuit 10 at the timing t35 in order to perform the clock supply process. When the stop control signal CTR_STP rises to high level, the stop control circuit 54 supplies the clock signal output from the frequency divider 53 to the internal circuit of the semiconductor apparatus 1 including the multimedia circuit 5 at the timing t36. At this time, the state machine (PWR) 32 is asserting the high-level power supply reset signal RESET_MM to the multimedia circuit 5 so that the multimedia circuit 5 does not malfunction. During reset, all clock gating of the multimedia circuit 5 is canceled, for example, and the internal clock signal is supplied to all the flip-flops for initialization. Therefore, the operating current of the multimedia circuit 5 increases. The increase in this operating current reduces an internal voltage VDD_MM of the multimedia circuit 5. However, since the input voltage VDD_IN of the semiconductor apparatus 1 is set to the voltage higher than the normally set voltage, the internal voltage VDD_MM of the multimedia circuit 5 will not be less than or equal to the minimum operating voltage Vmin of the multimedia circuit 5. Accordingly, the multimedia circuit 5 is normally initialized.

Then, at the timing t37 when the initialization process of the multimedia circuit 5 is completed (that is, after the initialization period), the state machine (PWR) 32 cancels the power supply reset signal RESET_MM asserted to the multimedia circuit 5 (that is, the power supply reset signal RESET_MM is set to low level). When the power supply reset signal RESET_MM is set to low level, the state machine (PWR) 32 enters the idle state again. Since the power supply process is completed at this time, the state machine (PWR) 32 outputs the low-level signal PRD_MM_ON to the notification signal generating circuit 11.

Further, the clock supply process of the state machine (CLK) 44 is completed and the state machine (CLK) 44 enters the idle state at the timing t37. Since the clock supply process is completed at this time, the state machine (CLK) 44 outputs the low-level signal PRD_CLK to the notification signal generating circuit 11.

The notification signal generating circuit 11 receives the low-level signal PRD_MM_ON and the signal PRD_CLK, and outputs the low-level notification signal NTC_SIG to the terminal 20. Since the notification signal NTC_SIG falls to low level, the voltage setting circuit 22 of the power supply apparatus 2 sets the voltage of the regulator 21 so that the voltage output from the regulator 21 will be the normally set voltage at the timing t38. Accordingly, the input voltage VDD_IN of the semiconductor apparatus 1 will be the normal voltage.

Note that FIG. 13 explained the case in which the timing for the state machine (CLK) 44 to transition to the idle state is simultaneous (at the timing t37) as the timing for the state machine (PWR) 32 to transition to the idle state. However, those timings may be different from each other. In this case, between the state machine (CLK) 44 and the state machine (PWR) 32, at the timing when the state machine which transitions later outputs the low-level signal to the notification signal generating circuit 11, the low-level notification signal NTC_SIG is output from the notification signal generating circuit 11.

Next, a comparative example of the present invention according to this embodiment is explained. The comparative example to be explained below illustrates an operation of the system including the semiconductor apparatus and the power supply apparatus shown in FIG. 8 (see the first embodiment).

Comparative Example C

Figure 14:
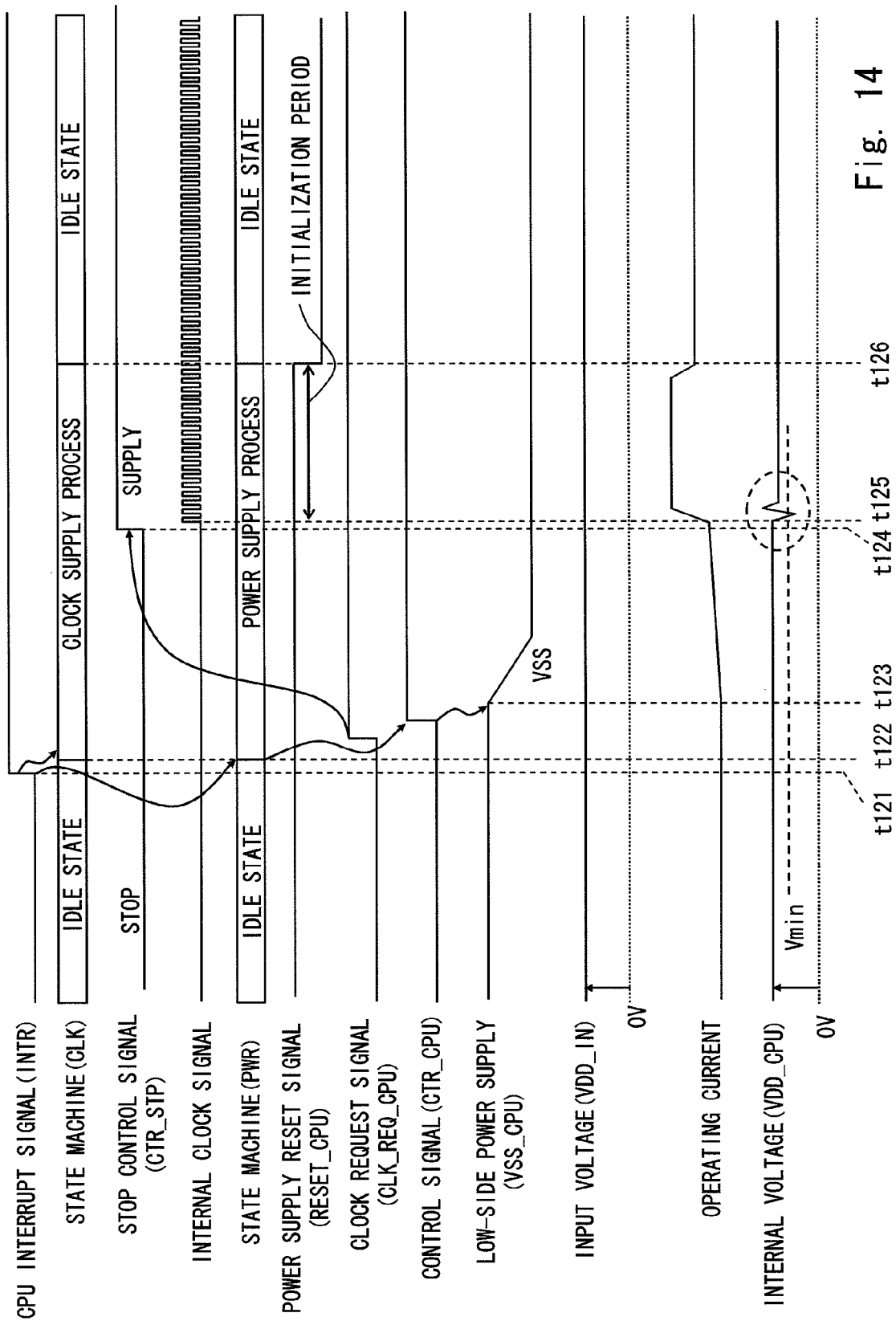
FIG. 14 is a timing chart showing an operation of the semiconductor apparatus shown in FIG. 8.

First, an operation example of the semiconductor apparatus shown in FIG. 8 is explained as the comparative example of the present invention according to this embodiment. FIG. 14 is a timing chart showing an operation of the semiconductor apparatus shown in FIG. 8. The timing chart shown in FIG. 14 illustrates the case in which the internal power control circuit 8 turns on the power of the CPU (4), and further the clock control circuit 9 switches the internal clock signal from the stopped state to the supply state. Note that the timing chart shown in FIG. 14 corresponds to the timing chart shown in FIG. 12, and is different from the timing chart shown in FIG. 12 in the point that the notification signal NTC_SIG is not generated and the input voltage VDD_IN is not set to the higher voltage than the normally set voltage.

In the initial state before the timing t121, the PLL circuit 51 is turned on, the selector 52 selects the output from the PLL circuit 51, and the frequency divider 53 outputs the high-speed clock signal to the stop control circuit 54. However, since the stop control signal CTR_STP is low level, the stop control circuit 54 does not supply the clock signal output from the frequency divider 53 to the internal circuit of the semiconductor apparatus 101.

When the CPU interrupt signal INTR rises to high level at the timing t121, the state machine (CLK) 44 transitions from the idle state to the clock supply process at the timing t122. Further, when the CPU interrupt signal INTR rises to high level at the timing t121, the state machine (PWR) 32 transitions from the idle state to the power supply process at the timing t122.

The state machine (PWR) 32, which transitioned to the power supply process at the timing t122, outputs the high-level clock request signal CLK_REQ_CPU to the state machine (CLK) 44 of the clock control circuit 9 so that the clock signal CLK_CPU is supplied to the CPU (4). Further, the state machine (PWR) 32 outputs the high-level control signal CTR_CPU to the gate of the transistor Tr2 connected to the CPU (4) in order to turn on the power of the CPU (4). When the high-level control signal CTR_CPU is supplied, the low-side power supply potential VSS_CPU gradually starts decreasing from the timing t123 and will be the operational potential VSS after a predetermined time. The operating current of the CPU (4) gradually starts increasing from the timing t123 when the low-side power supply potential VSS_CPU of the CPU (4) starts decreasing.

The state machine (CLK) 44, which is supplied with the high-level clock request signal CLK_REQ_CPU, outputs the high-level stop control signal CTR_STP to the stop control circuit 54 of the clock generating circuit 10 at the timing t124 in order to perform the clock supply process. When the stop control signal CTR_STP rises to high level, the stop control circuit 54 supplies the clock signal output from the frequency divider 53 to the internal circuit of the semiconductor apparatus 1 including the CPU (4) at the timing t125. At this time, the state machine (PWR) 32 is asserting the high-level power supply reset signal RESET_CPU to the CPU (4) so that the CPU (4) does not malfunction. During reset, all the clock gating of the CPU (4) is canceled, for example, and the internal clock signal is supplied to all the flip-flops for initialization. Accordingly, the operating current of the CPU (4) increases. The increase in the operating current reduces the internal voltage VDD_CPU of the CPU (4). Therefore, the internal voltage VDD_CPU of the CPU (4) will be less than or equal to the minimum operating voltage Vmin of the CPU (4), and the initialization process is not normally performed.

Then, at the timing t126 when the initialization process of the CPU (4) is completed (that is, after the initialization period), the state machine (PWR) 32 cancels the power supply reset signal RESET_CPU asserted to the CPU (4) (that is, the power supply reset signal RESET_CPU is set to low level). When the power supply reset signal RESET_CPU is set to low level, the state machine (PWR) 32 enters the idle state again.

Comparative Example D

Figure 15:
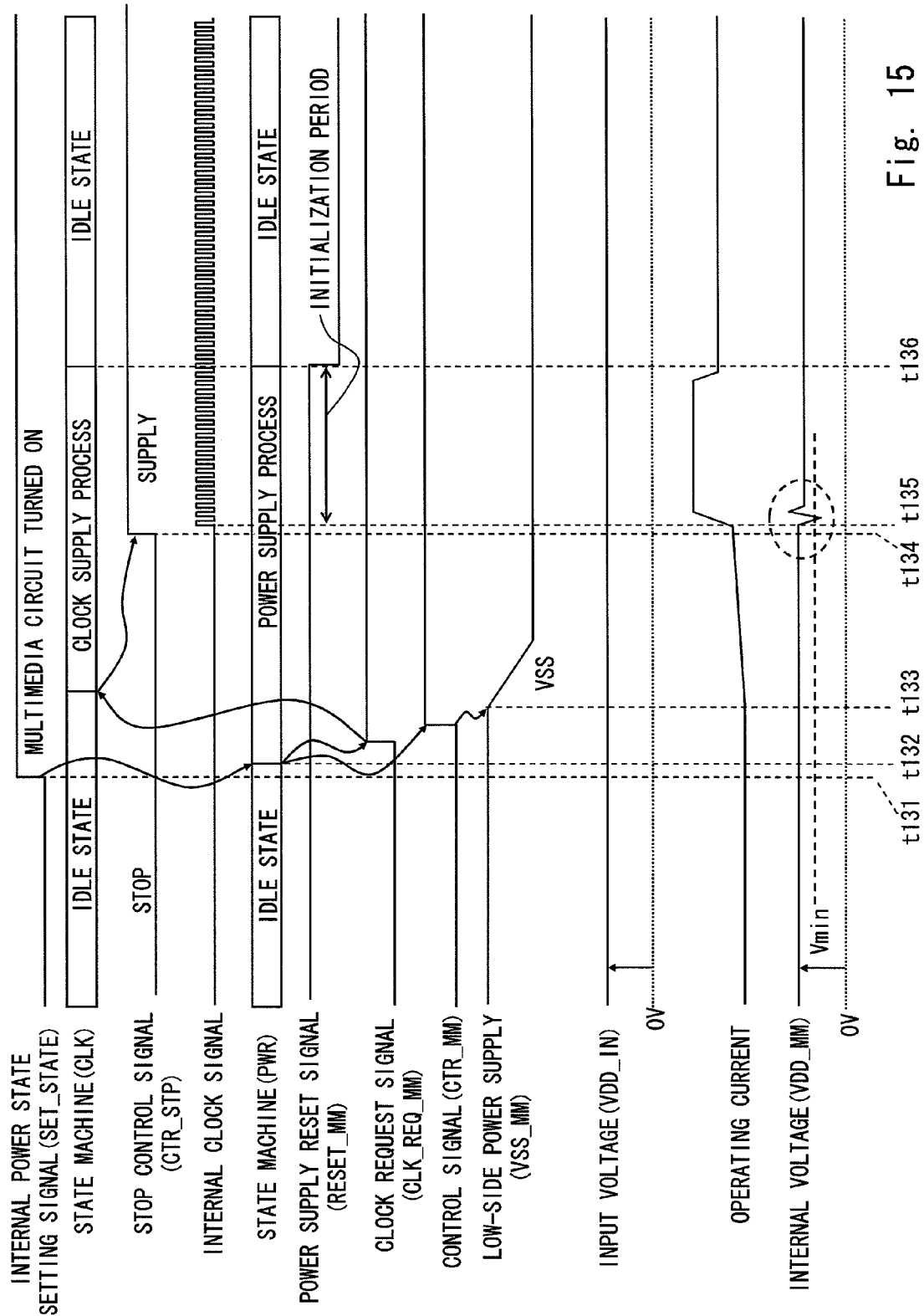
FIG. 15 is a timing chart showing an operation of the semiconductor apparatus shown in FIG. 8.

Next, another operation example of the semiconductor apparatus shown in FIG. 8 is explained as a comparative example of the present invention according to this embodiment. FIG. 15 is a timing chart showing an operation of the semiconductor apparatus shown in FIG. 8. The timing chart shown in FIG. 15 illustrates the case in which the internal power control circuit 8 turns on the power of the multimedia circuit 5, and further the clock control circuit 9 switches the internal clock signal from the stopped state to the supply state. Note that the timing chart shown in FIG. 15 corresponds to the timing chart shown in FIG. 13, and is different from the timing chart shown in FIG. 13 in the point that the notification signal NTC_SIG is not generated and the input voltage VDD_IN is not set to the higher voltage than the normally set voltage.

In the initial state before the timing t131, the PLL circuit 51 is turned on, the selector 52 selects the output from the PLL circuit 51, and the frequency divider 53 outputs the high-speed clock signal to the stop control circuit 54. However, since the stop control signal CTR_STP is low level, the stop control circuit 54 does not supply the clock signal output from the frequency divider 53 to the internal circuit of the semiconductor apparatus 101.

When the internal power state setting signal SET_STATE that turns on the multimedia circuit 5 is supplied at the timing t131, the state machine (PWR) 32 transitions from the idle state to the power supply process at the timing t132.

The state machine (PWR) 32, which transitioned to the power supply process at the timing t132, outputs the high-level clock request signal CLK_REQ_MM to the state machine (CLK) 44 of the clock control circuit 9 so that the clock signals CLK_MM_CPU, CLK_MM_M, and CLK_BUS_B are respectively supplied to the multimedia CPU (6), the multimedia module 7, and the internal bus B (13). When the high-level clock request signal CLK_REQ_MM is supplied, the state machine (CLK) 44 transitions from the idle state to the clock supply process.

Further, the state machine (PWR) 32 outputs the high-level control signal CTR_MM to the gate of the transistor Tr3 connected to the multimedia circuit 5 in order to turn on the power of the multimedia circuit 5. When the high-level control signal CTR_MM is supplied, the low-side power potential VSS_MM of the multimedia circuit 5 gradually starts decreasing from the timing t133 and will be the low-side operational potential VSS after a predetermined time. Additionally, the operating current of the multimedia circuit 5 gradually starts increasing from the timing t133 when the low-side power supply potential VSS_MM of the multimedia circuit 5 starts decreasing.

Moreover, the state machine (CLK) 44, which is supplied with the high-level clock request signal CLK_REQ_MM, outputs the high-level stop control signal CTR_STP to the stop control circuit 54 of the clock generating circuit 10 at the timing t134 in order to perform the clock supply process. When the stop control signal CTR_STP rises to high level, the stop control circuit 54 supplies the clock signal output from the frequency divider 53 to the internal circuit of the semiconductor apparatus 101 including the multimedia circuit 5 at the timing t135. At this time, the state machine (PWR) 32 is asserting the high-level power supply reset signal RESET_MM to the multimedia circuit 5 so that the multimedia circuit 5 does not malfunction. During reset, all clock gating of the multimedia circuit 5 is canceled, for example, and the internal clock signal is supplied to all the flip-flops for initialization. Accordingly, the operating current of the multimedia circuit 5 increases. The increase in this operating current reduces the internal voltage VDD_MM of the multimedia circuit 5. Therefore, the internal voltage VDD_MM of the multimedia circuit 5 will be less than or equal to the minimum operating voltage Vmin of the multimedia circuit 5, and the initialization process is not normally performed.

Then, at the timing t136 when the initialization process of the multimedia circuit 5 is completed (that is, after the initialization period), the state machine (PWR) 32 cancels the power supply reset signal RESET_MM asserted to the multimedia circuit 5 (that is, the power supply reset signal RESET_MM is set to low level). When the power supply reset signal RESET_MM is set to low level, the state machine (PWR) 32 enters the idle state again.

In the system including the semiconductor apparatus 101 and the power supply apparatus 102 shown in FIG. 8, when the internal clock signal is supplied to the CPU (4) and the multimedia circuit 5 as shown in FIGS. 14 and 15, for example, the operating current of the CPU (4) and the multimedia circuit 5 increases. The increase in the operating current reduces the internal voltages VDD_CPU and VDD_MM of the CPU (4) and the multimedia circuit 5. Therefore, there has been a problem that the internal voltages VDD_CPU and VDD_MM of the CPU (4) and the multimedia circuit 5 will temporarily be less than or equal to the minimum operating voltage Vmin of the CPU (4) and the multimedia circuit 5, and the CPU (4) and the multimedia circuit 5 are not normally initialized.

On the other hand, in the semiconductor apparatus 1 according to this embodiment, the notification signal generating circuit 11 is included that generates the notification signal NTC_SIG for notifying that the operating current increases in the internal circuit of the semiconductor apparatus 1. Therefore, the increase in the operating current can be detected beforehand in the internal circuit of the semiconductor apparatus 1. Accordingly, even when the operating current of the semiconductor apparatus 1 rapidly increases, the power supplied to the semiconductor apparatus 1 can be increased without delay and the internal circuit of the semiconductor apparatus can be normally initialized.

Additionally, the notification signal generating circuit 11 of the semiconductor apparatus 1 according to this embodiment can generate the notification signal NTC_SIG according to the process of the state machine (PWR) 32 of the internal power control circuit 8. That is, the notification signal NTC_SIG in the active state can be generated in synchronization with the power supply process for the DSP (3), the power supply process for the CPU (4), or the power supply process for the multimedia circuit 5 by the state machine (PWR) 32. As described above, generating the notification signal NTC_SIG in the active state according to the process of the state machine (PWR) 32 enables correct and easy generation of the notification signal NTC_SIG. Note that other effects are same as the first embodiment.

Although FIG. 12 explained the case in which the CPU (4) switches from being turned off to turned on as an example and FIG. 13 explained the case in which the multimedia circuit 6 switches from being turned off to turned on as an example, the case in which the DSP (3) switches from being turned off to turned on is the same as these cases.

The present invention according to this embodiment described above can provide a semiconductor apparatus and a system including the semiconductor apparatus that can achieve stable operation.

Third Embodiment

Next, a third embodiment of the present invention is explained. The first embodiment explained the operation in the case of controlling the supply of the internal clock signal using the clock control circuit 9 of the semiconductor apparatus 1 (see FIGS. 6 and 7). The second embodiment explained the operation of controlling the power of the DSP (3), the CPU (4), and the multimedia circuit 5 using the internal power control circuit 8 while controlling the supply of the internal clock signal using the clock control circuit 9 of the semiconductor apparatus 1 (see FIGS. 12 and 13). This embodiment explains an operation of controlling the power of the DSP (3), the CPU (4), and the multimedia circuit 5 using the internal control circuit 8 of the semiconductor apparatus 1. Note that as a system including a semiconductor apparatus and a power supply apparatus used in this embodiment is same as the system including the semiconductor apparatus 1 and the power supply apparatus 2 explained in the first embodiment (FIGS. 3 to 5), repeated explanation is omitted.

Operation Example E of the Semiconductor Apparatus

Figure 16:
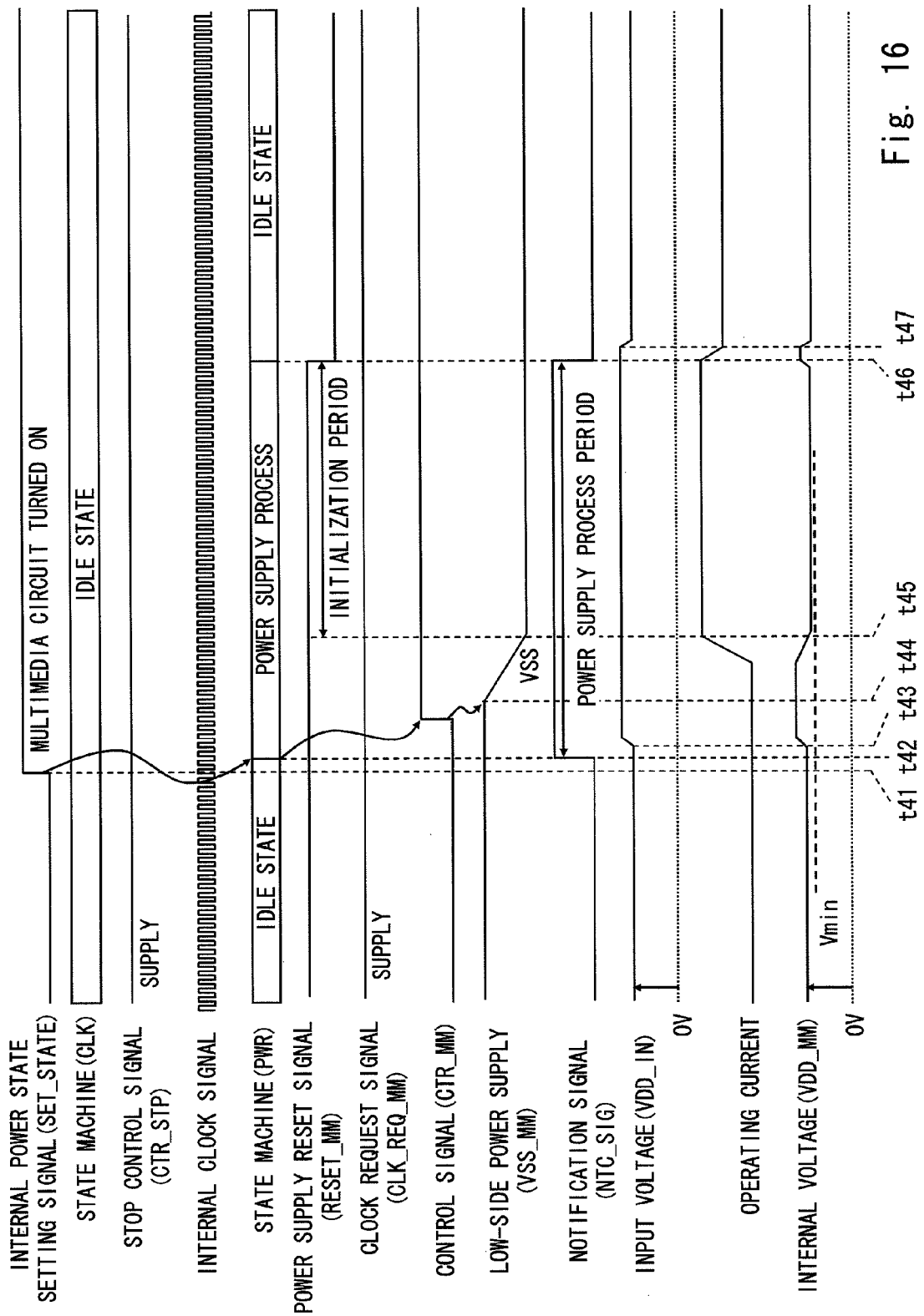
FIG. 16 is a timing chart showing an operation of the semiconductor apparatus according to a third embodiment.

An operation example of the semiconductor apparatus 1 according to this embodiment is explained. FIG. 16 is a timing chart showing an operation of the semiconductor apparatus according to this embodiment. The timing chart shown in FIG. 16 illustrates the case in which the internal power control circuit 8 turns on the power of the multimedia circuit 5.

In the initial state before the timing t41, the PLL circuit 51 is turned on, the selector 52 selects the output from the PLL circuit 51, and the frequency divider 53 outputs the high-speed clock signal to the stop control circuit 54. Then, since the stop control signal CTR_STP is high level, the stop control circuit 54 supplies the internal clock signal output from the frequency divider 53 to the internal circuit of the semiconductor apparatus 1. At this time, the state machine (CLK) 44 of the clock control circuit 9 is in the idle state. The power of the multimedia circuit 5 is turned off.

When the internal power state setting signal SET_STATE that turns on the multimedia circuit 5 is supplied at the timing t41, the state machine (PWR) 32 transitions from the idle state to the power supply process at the timing t42. At this time, the state machine (PWR) 42 outputs the high-level signal PRD_MM_ON indicating the period of performing the power supply process to the notification signal generating circuit 11.

The notification signal generating circuit 11 receives the high-level signal PRD_MM_ON and outputs the high-level notification signal NTC_SIG to the terminal 20. At this time, the high-level signal is supplied from the register 60 to one input of the AND3 shown in FIG. 5.

The high-level notification signal NTC_SIG output to the terminal 20 is supplied to the voltage setting circuit 22 via the terminal 23 of the power supply apparatus 2. Then, the voltage setting circuit 22 sets the voltage of the regulator 21 so that the voltage output from the regulator 21 will be higher than the normally set voltage at the timing t43. Accordingly, the input voltage VDD_IN of the semiconductor apparatus 1 increases.

Further, the state machine (PWR) 32 outputs the high-level control signal CTR_MM to the gate of the transistor Tr3 connected to the multimedia circuit 5 in order to turn on the power of the multimedia circuit 5. When the high-level control signal CTR_MM is supplied, the low-side power potential VSS_MM of the multimedia circuit 5 gradually starts decreasing from the timing t44 and will be the low-side operational potential VSS at the timing t45 when a predetermined time elapsed. At this time, the high-speed internal clock signal is supplied to the multimedia circuit 5.

Further, the state machine (PWR) 32 is asserting the high-level power supply reset signal RESET_MM to the multimedia circuit 5 so that the multimedia circuit 5 does not malfunction. During reset, all clock gating of the multimedia circuit 5 is canceled, for example, and the internal clock signal is supplied to all the flip-flops for initialization. Therefore, the operating current of the multimedia circuit 5 increases. The increase in this operating current reduces the internal voltage VDD_MM of the multimedia circuit 5. However, since the input voltage VDD_IN of the semiconductor apparatus 1 is set to the higher voltage than the normally set voltage, the internal voltage VDD_MM of the multimedia circuit 5 will not be less than or equal to the minimum operating voltage Vmin of the multimedia circuit 5. Accordingly, the multimedia circuit 5 is normally initialized.

Then, at the timing t46 when the initialization process of the multimedia circuit 5 is completed (that is, after the initialization period), the state machine (PWR) 32 cancels the power supply reset signal RESET_MM asserted to the multimedia circuit 5 (that is, the power supply reset signal RESET_MM is set to low level). When the power supply reset signal RESET_MM is set to low level, the state machine (PWR) 32 enters the idle state again. Since the power supply process is completed at this time, the state machine (PWR) 32 outputs the low-level signal PRD_MM_ON to the notification signal generating circuit 11.

The notification signal generating circuit 11 receives the low-level signal PRD_MM_ON and outputs the low-level notification signal NTC_SIG to the terminal 20. Since the notification signal NTC_SIG is set to low level, the voltage setting circuit 22 of the power supply apparatus 2 sets the voltage of the regulator 21 so that the voltage output from the regulator 21 will be the normally set voltage at the timing t47. Accordingly, the input voltage VDD_IN of the semiconductor apparatus 1 will be the normal voltage.

Comparative Example E

Figure 17:
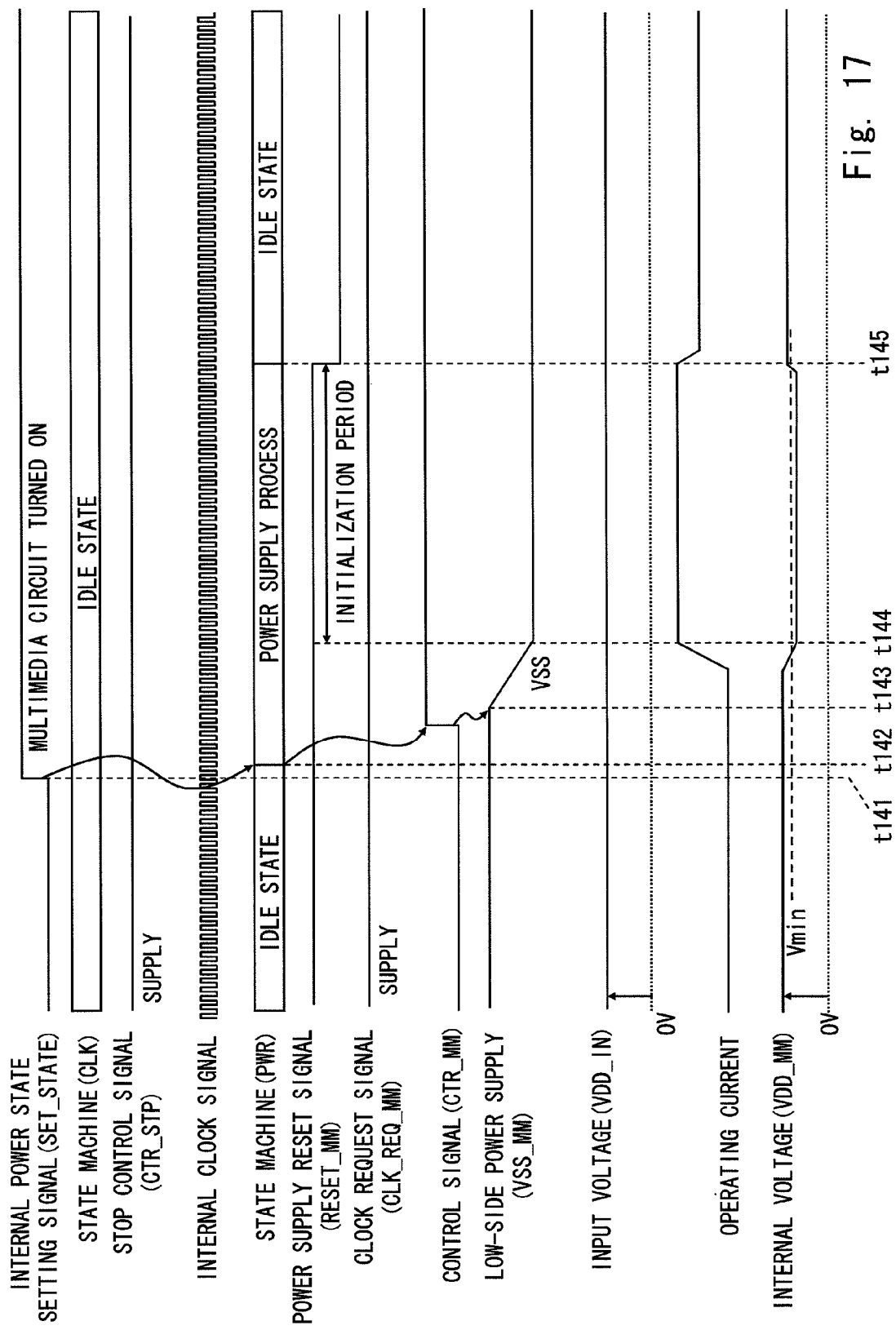
FIG. 17 is a timing chart showing an operation of the semiconductor apparatus shown in FIG. 8.

Next, a comparative example of the present invention according to this embodiment is explained. Note that the comparative example explained below illustrates the operation of the system including the semiconductor apparatus and the power supply apparatus shown in FIG. 8 (see the first embodiment). FIG. 17 is a timing chart showing an operation of the semiconductor apparatus shown in FIG. 8 according to this embodiment. The timing chart shown in FIG. 17 illustrates the case in which the internal power control circuit 8 turns on the power of the multimedia circuit 5. Note that the timing chart shown in FIG. 17 corresponds to the timing chart shown in FIG. 16, and is different from the timing chart shown in FIG. 16 in the point that the notification signal NTC_SIG is not generated and the input voltage VDD_IN is not set to the higher voltage than the normally set voltage.

In the initial state before the timing t141, the PLL circuit 51 is turned on, the selector 52 selects the output from the PLL circuit 51, and the frequency divider 53 outputs the high-speed clock signal to the stop control circuit 54. Then, since the stop control signal CTR_STP is high level, the stop control circuit 54 supplies the internal clock signal output from the frequency divider 53 to the internal circuit of the semiconductor apparatus 101. At this time, the state machine (CLK) 44 of the clock control circuit 9 is in the idle state. The power of the multimedia circuit 5 is turned off.

When the internal power state setting signal SET_STATE that turns on the multimedia circuit 5 is supplied at the timing t141, the state machine (PWR) 32 transitions from the idle state to the power supply process at the timing t142. After that, the state machine (PWR) 32 outputs the high-level control signal CTR_MM to the gate of the transistor Tr3 connected to the multimedia circuit 5 in order to turn on the power of the multimedia circuit 5. When the high-level control signal CTR_MM is supplied, the low-side power potential VSS_MM of the multimedia circuit 5 gradually starts decreasing from the timing t143 and will be the low-side operational potential VSS at the timing t144 when a predetermined time elapsed.

At this time, the state machine (PWR) 32 is asserting the high-level power supply reset signal RESET_MM to the multimedia circuit 5 so that the multimedia circuit 5 does not malfunction. During reset, all clock gating of the multimedia circuit 5 is canceled, for example, and the internal clock signal is supplied to all the flip-flops for initialization. Accordingly, the operating current of the multimedia circuit 5 increases. The increase in this operating current reduces the internal voltage VDD_MM of the multimedia circuit 5. Therefore, the internal voltage VDD_MM of the multimedia circuit 5 will be less than or equal to the minimum operating voltage Vmin of the multimedia circuit 5, and the initialization process is not normally performed.

Then, at the timing t145 when the initialization process of the multimedia circuit 5 is completed (that is, after the initialization period), the state machine (PWR) 32 cancels the power supply reset signal RESET_MM asserted to the multimedia circuit 5 (that is, the power supply reset signal RESET_MM is set to low level). When the power supply reset signal RESET_MM is set to low level, the state machine (PWR) 32 enters the idle state again.

In the system including the semiconductor apparatus 101 and the power supply apparatus 102 shown in FIG. 8, as shown in FIG. 17, when the multimedia circuit 5 is turned on, the operating current of the multimedia circuit 6 increases. The increase in this operating current reduces the internal voltage VDD_MM of the multimedia circuit 5. Therefore, the internal voltage VDD_MM of the multimedia circuit 5 will be less than or equal to the minimum operating voltage Vmin of the multimedia circuit 5, and the multimedia circuit 5 is not normally initialized.

On the other hand, in the semiconductor apparatus 1 according to this embodiment, the notification signal generating circuit 11 is included that generates the notification signal NTC_SIG for notifying that the operating current increases in the internal circuit of the semiconductor apparatus 1. Therefore, the increase in the operating current of the internal circuit of the semiconductor apparatus 1 can be detected beforehand. Accordingly, even when the operating current of the semiconductor apparatus 1 rapidly increases, the power supplied to the semiconductor apparatus 1 can be increased without delay and the internal circuit of the semiconductor apparatus 1 can be normally initialized.

Further, the notification signal generating circuit 11 of the semiconductor apparatus 1 according to this embodiment can generate the notification signal NTC_SIG according to the process of the state machine (PWR) 32 of the internal power control circuit 8. That is, the notification signal NTC_SIG in the active state can be generated in synchronization with the power supply process for the DSP (3), the power supply process for the CPU (4), or the power supply process for the multimedia circuit 5 by the state machine (PWR) 32. As described above, generating the notification signal NTC_SIG in the active state according to the process of the state machine (PWR) 32 enables correct and easy generation of the notification signal NTC_SIG. Note that other effects are same as the first embodiment.

Although FIG. 16 explained the case in which the multimedia circuit 5 switches from being turned off to turned on, the case in which the DSP (3) and the CPU (4) switch from being turned off to turned on is the same as the above case.

The present invention according to this embodiment described above can provide a semiconductor apparatus and a system including the semiconductor apparatus that can achieve stable operation.

Fourth Embodiment

Next, a fourth embodiment of the present invention is explained.

Figure 18:
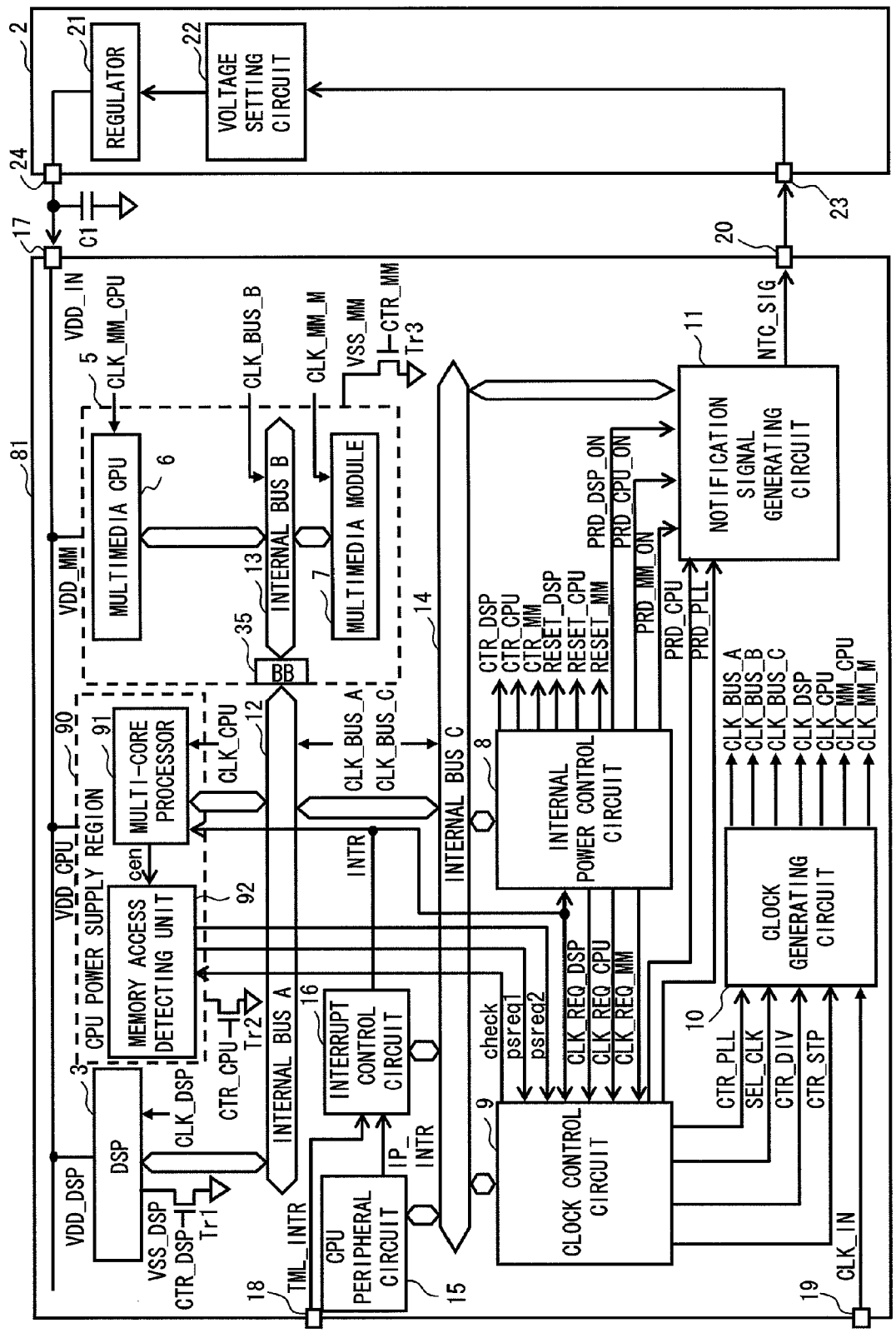
FIG. 18 is a block diagram showing a system including a semiconductor apparatus and a power supply apparatus according to a fourth embodiment.

FIG. 18 is a block diagram showing a system including a semiconductor apparatus 81 and a power supply apparatus 2 according to the fourth embodiment. The semiconductor device 81 according to this embodiment differs from the semiconductor apparatus 1 according to the first embodiment in the point that a multi-core processor 91 and a memory access detecting unit 92 are included as circuits including a predetermined function. Other points are same as the system including the semiconductor apparatus 1 and the power supply apparatus 2. Thus the same components are denoted by the same numerals and repeated explanation is omitted.

As shown in FIG. 18, a CPU power supply region 90 of the semiconductor apparatus 81 includes the processor 91 (for example a multi-core processor) that has a CPU and a cache memory, and the memory access detecting unit 92 that detects the number of times the CPU accesses the cache memory and calculates an expected amount of current consumption in the processor based on the number of accesses. For example, the multi-core processor 91 includes a plurality of cores, a level one cache provided for each core, and a level two cache shared between the cores, and performs various processes.

A high-side power supply voltage VDD is supplied to the CPU power supply region 90 (that is, the multi-core processor 91 and the memory access detecting unit 92) from the power supply apparatus 2 via the terminal 17. Further, the CPU power supply region 90 is connected to the low-side power supply (for example, ground) via the transistor Tr2, which is a switch. Accordingly, when the transistor Tr2 is turned on (conductive state), the power is supplied to the multi-core processor 91 and the memory access detecting unit 92. The control signal CTR_CPU output from the internal power control circuit 8 controls turning on and off the power supplied to the CPU power region 90, which is to control turning on and off the transistor Tr2. Moreover, the clock signal CLK_CPU output from the clock generating circuit 10 is supplied to the multi-core processor 91. The multi-core processor 91 can transmit and receive data to and from other circuits via the internal bus A (12).

The memory access detecting unit 92 detects the number of activation (the number of accesses) of an access signal cen that is output when each core in the multi-core processor 91 accesses the level one cache and the level two cache, that is, an activation ratio. For example, accesses to the level one and the level two cache in each core are controlled by a memory controller included inside the multi-core processor 91. The access signal cen is output from this memory controller. Then, the memory access detecting unit 92 calculates the expected amount of current consumption in the multi-core processor 91 based on the number of activation (the number of accesses) of the access signal cen. At this time, the memory access detecting unit 92 may calculate the expected amount of current consumption from the activation ratio of the access signal cen. When this expected amount of current consumption exceeds a reference value, the memory access detecting unit 92 outputs to the clock control circuit 9 a request signal psreq1 for requesting a reduction in the frequency of the clock signal CLK_CPU supplied to the multi-core processor 91. Further, also when an amount of change in this expected amount of current consumption exceeds a predetermined reference value, the memory access detecting unit 92 outputs to the clock control circuit 9 a request signal psreq2 for requesting a reduction in the frequency of the clock signal CLK_CPU supplied to the multi-core processor 91.

The internal power control circuit 8 outputs to the gate of the transistor Tr2 the control signal CTR_CPU for controlling turning on and off the power of the CPU power supply region 90. Moreover, the internal power control circuit 8 outputs to the clock control circuit 9 the clock request signal CLK_REQ_CPU for requesting supply of the clocks to the multi-core processor 91.

The clock control circuit 9 periodically outputs to the memory access detecting unit 92 an execution signal check for causing the memory access detecting unit 92 to detect the number of activation and the activation ratio. Further, the clock control circuit 9 outputs the frequency division control signal CTR_DIV according to the request signals psreq1 and psreq2 output from the memory access detecting unit 92 to the clock generating circuit 10. Furthermore, the clock control circuit 9 outputs the stop control signal CTR_STP according to the clock request signal CLK_REQ_CPU output from internal power control circuit 8 to the clock generating circuit 10. That is, when the clock request signal CLK_REQ_CPU is output from the internal power control circuit 8, the clock control circuit 9 outputs the stop control signal CTR_STP for canceling to stop the clock signal CLK_CPU. Accordingly, the clock generating circuit 10 starts outputting the clock signal CLK_CPU.

The clock generating circuit 10 can change the frequency of the clock signal CLK_CPU supplied to the multi-core processor 91 according to the frequency division control signal CTR_DIV output from the clock control circuit 9. Further, the clock generating circuit 10 starts or stops outputting each clock signal according to the stop control signal CTR_STP output from the clock control circuit 10. Note that the configuration and operation of the clock control circuit 9 and the clock generating circuit 10 are basically the same as those of the first to third embodiments.

The CPU peripheral circuit 15 is a circuit used by the multi-core processor 91. As the CPU peripheral circuit 15, there are for example a timer unit, a watchdog timer unit, a DMA (Direct Memory Access) unit, a low voltage detecting unit, a power-on-reset (POR) unit, and the like. The CPU peripheral circuit 15 is connected to the internal bus C (14).

As described above, the semiconductor apparatus 81 according to this embodiment includes the memory access detecting unit 92 that detects the number of accesses from each core to each memory region and can expect the amount of current consumption in the multi-core processor 91. Therefore, when this expected amount of current consumption or the amount of change thereof exceed the reference value, the frequency of the clock signal CLK_CPU supplied to the multi-core processor 91 can be automatically reduced. Therefore, malfunction caused by exceeding the amount of allowable current can be prevented.

Although in this embodiment, the processor is the multi-core processor, it is needless to say that the present invention according to this embodiment can be applied to a single-core processor. It is rare in the multi-core processor that the operation rates of the cores increase at the same time. Therefore, increasing the amount of allowable current in accordance with such a case is not preferable as it leads to a larger size and an increase in the cost. This embodiment can temporarily reduce the frequency of the clock signal supplied to the processor without increasing the amount of allowable current only when the operation rates of cores increase at the same time. Accordingly, the present invention according to this embodiment is preferable for multi-core processor usage.

The first to fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor apparatus comprising;
a circuit including a predetermined function;
a clock generating circuit that generates a clock signal supplied to the circuit;
a clock control circuit that outputs:
a plurality of control signals to the clock generating circuit,
a first signal that indicates when a frequency of the clock signal is being changed from a predetermined frequency to a higher frequency, and
a second signal that indicates when the clock signal is being supplied to the circuit; and
a notification signal generating circuit, coupled to the clock control circuit, that generates a notification signal for notifying a power supply apparatus when the clock signal frequency is being changed based on the first signal, and when the clock signal is being supplied to the circuit based on the second signal.

2. The semiconductor apparatus according to claim 1, wherein a power supply voltage to be supplied to the circuit is adjusted according to the notification signal.

3. The semiconductor apparatus according to claim 1, further comprising:
a power control circuit that controls power supplied to the circuit,
wherein the notification signal notifies when the power control circuit is performing power control.

4. The semiconductor apparatus according to claim 3, wherein the notification signal generating circuit generates the notification signal when the power control circuit controls the circuit so that the power is supplied to the circuit.

5. The semiconductor apparatus according to claim 3, wherein the notification signal generating circuit generates the notification signal when the power control circuit controls the circuit so that the power is supplied to the circuit.

6. The semiconductor apparatus according to claim 3, wherein
the power control circuit comprises a state machine, and
the notification signal generating circuit generates the notification signal according to a state of the state machine.

7. The semiconductor apparatus according to claim 6, wherein the notification signal generating circuit generates the notification signal in a period when the state machine performs a process to supply the power to the circuit.

8. The semiconductor apparatus according to claim 1, wherein the notification signal notifies that an operating current of the circuit has increased.

9. The semiconductor apparatus according to claim 1, wherein
the clock control circuit comprises a state machine having a plurality of states including a clock frequency change process state and a clock supply process state,
the first signal is output during the clock frequency change process state, and
the second signal is output during the clock supply process state.

10. The semiconductor apparatus according to claim 9, wherein the notification signal generating circuit generates the notification signal in a period when the state machine performs a process to increase a frequency of the clock signal supplied to the circuit to be higher than a predetermined frequency.

11. The semiconductor apparatus according to claim 9, wherein the notification signal generating circuit generates the notification signal in a period when the state machine performs a process to supply the clock signal to the circuit.

12. The semiconductor apparatus according to claim 9, wherein the plurality of states includes a clock stop process state and an idle state.

13. The semiconductor apparatus according to claim 1, wherein
the circuit comprises a processor including a CPU and a cache memory and a memory access detecting unit that detects the number of accesses to the cache memory by the CPU and calculates an expected amount of current consumption in the processor according to the number of accesses, and
the clock control circuit controls the clock generating circuit so that the frequency of the clock signal supplied to the circuit is reduced when the calculated expected amount of current consumption exceeds a predetermined reference value.

14. The semiconductor apparatus according to claim 1, further comprising:
a first terminal that supplies the power supply voltage to the circuit; and
a second terminal that is supplied with the notification signal.

15. The semiconductor apparatus according to claim 1, wherein the plurality of control signals includes a phase locked loop (PLL) control signal, a frequency division control signal, a stop control signal, and a clock selecting signal.

16. A semiconductor apparatus comprising:
a circuit including a predetermined function;
a power control circuit that outputs:
a power control signal to the circuit, and
a signal that indicates when the power control signal is being supplied to the circuit; and
a notification signal generating circuit, coupled to the power control circuit, that generates a notification signal for notifying a power supply apparatus when the power control signal is being supplied to the circuit based on the signal.

17. The semiconductor apparatus according to claim 16, wherein a power supply voltage supplied to the circuit is adjusted according to the notification signal.

18. The semiconductor apparatus according to claim 16, wherein
the power control circuit comprises a state machine having a plurality of states including a power supply process state, and
the signal is output during the power supply process state.

19. The semiconductor apparatus according to claim 18, wherein the notification signal generating circuit generates the notification signal in a period when the state machine performs a process to supply the power to the circuit.

20. The semiconductor apparatus according to claim 18, wherein the plurality of states includes a power stop state and an idle state.

21. A system comprising:
a semiconductor apparatus comprising;
a circuit including a predetermined function;
a clock generating circuit that generates a clock signal supplied to the circuit;
a clock control circuit that controls the clock generating circuit and outputs:

a plurality of clock control signals to the clock generating circuit,
a first signal that indicates when a frequency of the clock signal is being changed from a predetermined frequency to a higher frequency, and
a second signal that indicates when the clock signal is being supplied to the circuit;
a power control circuit that outputs:
a power control signal to the circuit, and
a third signal that indicates when the power control signal is being supplied to the circuit; and
a notification signal generating circuit, coupled to the clock control circuit and the power control circuit, that generates a notification signal for notifying when the clock signal frequency is being changed based on the first signal, when the clock signal is being supplied to the circuit based on the second signal, and when the power control signal is being supplied to the circuit based on the third signal; and
an output terminal, coupled to the notification signal generating circuit, for providing the notification signal; and
a power supply apparatus, including an input terminal coupled to the output terminal, that supplies power to the semiconductor apparatus based on the notification signal.

22. The system according to claim 21,
wherein the power supply apparatus increases a voltage of the power supplied to the semiconductor apparatus when a signal in an active state is supplied as the notification signal.

\* \* \* \* \*